United States Patent
Raisch et al.

(10) Patent No.: US 11,269,794 B2
(45) Date of Patent: Mar. 8, 2022

(54) DIRECTED INTERRUPT FOR MULTILEVEL VIRTUALIZATION WITH INTERRUPT TABLE

(71) Applicant: INTERNATIONAL BUSINESS MACHINES CORPORATION, Armonk, NY (US)

(72) Inventors: Christoph Raisch, Gerlingen (DE); Marco Kraemer, Sindelfingen (DE); Donald William Schmidt, Stone Ridge, NY (US); Bernd Nerz, Boeblingen (DE); Peter Dana Driever, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/789,556

(22) Filed: Feb. 13, 2020

(65) Prior Publication Data

US 2020/0264994 A1 Aug. 20, 2020

(30) Foreign Application Priority Data

Feb. 14, 2019 (EP) .................................... 19157100

(51) Int. Cl.
*G06F 13/24* (2006.01)
*G06F 9/455* (2018.01)
(Continued)

(52) U.S. Cl.
CPC .......... *G06F 13/24* (2013.01); *G06F 9/45554* (2013.01); *G06F 9/4812* (2013.01); *G06F 9/5077* (2013.01); *G06F 12/1081* (2013.01)

(58) Field of Classification Search
CPC .... G06F 13/24; G06F 9/45554; G06F 9/4812; G06F 9/5077; G06F 12/1081
See application file for complete search history.

(56) References Cited

U.S. PATENT DOCUMENTS 5,577,255 A 11/1996 Roemer
6,460,105 B1 10/2002 Jones
(Continued)

FOREIGN PATENT DOCUMENTS

TW 200636485 A 10/2006
TW 201310345 A 3/2013
(Continued)

OTHER PUBLICATIONS

IBM, "z/Architecture—Principles of Operation," IBM Publication No. SA22-7832-12, Thirteenth Edition, Sep. 2019, pp. 1-2000.
(Continued)

*Primary Examiner* — Henry Tsai
*Assistant Examiner* — Aurangzeb Hassan
(74) *Attorney, Agent, or Firm* — Steven Chiu, Esq.; Blanche E. Schiller, Esq.; Heslin Rothenberg Farley & Mesiti P.C.

(57) ABSTRACT

An interrupt signal is provided to a first guest operating system. A bus attachment device receives an interrupt signal from a bus connected module with an interrupt target ID identifying a processor assigned for use by the guest operating system as a target processor for handling the interrupt signal. The bus attachment device translates the received interrupt target ID to a logical processor ID of the target processor using an interrupt table entry stored in a memory section assigned to a second guest operating system hosting the first operating system and forwards the interrupt signal to the target processor for handling. The logical processor ID of the target processor is used to address the target processor directly.

20 Claims, 22 Drawing Sheets

(51) Int. Cl.
  *G06F 9/48* (2006.01)
  *G06F 9/50* (2006.01)
  *G06F 12/1081* (2016.01)

(56) References Cited

U.S. PATENT DOCUMENTS

| | | |
|---|---|---|
| 7,281,075 B2 | 10/2007 | Armstrong |
| 7,386,640 B2 | 6/2008 | Lee et al. |
| 7,447,820 B2 | 11/2008 | Raj |
| 8,453,143 B2 | 5/2013 | Mahalingam |
| 8,601,194 B2 | 12/2013 | Tsirkin |
| 8,612,659 B1 | 12/2013 | Serebrin |
| 9,032,127 B2 | 5/2015 | Fischer |
| 9,043,521 B2 | 5/2015 | Tiruvallur |
| 9,116,869 B2 | 8/2015 | Madukkarumukumana |
| 9,378,162 B2 | 6/2016 | Jebson |
| 9,465,760 B2 | 10/2016 | Egi |
| 9,507,740 B2 | 11/2016 | Feehrer |
| 9,697,029 B2 | 7/2017 | Tsirkin |
| 9,772,868 B2 | 9/2017 | Tu |
| 9,830,286 B2 | 11/2017 | Tsirkin |
| 9,910,699 B2 | 3/2018 | Sankaran |
| 9,910,700 B2 | 3/2018 | Prosch |
| 9,940,291 B2 | 4/2018 | Bacha |
| 9,952,987 B2 | 4/2018 | Guddeti et al. |
| 10,078,603 B2 | 9/2018 | Tsirkin |
| 10,282,327 B2 | 5/2019 | Farrell et al. |
| 10,713,095 B2 | 7/2020 | Yoo |
| 10,922,111 B2 | 2/2021 | Raisch |
| 11,016,800 B2 | 5/2021 | Kraemer |
| 2003/0200250 A1 | 10/2003 | Klick |
| 2003/0204655 A1 | 10/2003 | Schmisseur |
| 2005/0080982 A1 | 4/2005 | Vasilevsky |
| 2005/0125580 A1 | 6/2005 | Madukkarumukumana |
| 2006/0233203 A1 | 10/2006 | Iwamura |
| 2008/0162762 A1 | 7/2008 | Neiger |
| 2009/0183180 A1 | 7/2009 | Nelson |
| 2010/0095039 A1 | 4/2010 | Marietta |
| 2011/0047309 A1 | 2/2011 | Brinkman |
| 2011/0087814 A1 | 4/2011 | Liu |
| 2011/0197003 A1 | 8/2011 | Serebrin et al. |
| 2011/0273309 A1 | 11/2011 | Zhang |
| 2011/0320664 A1 | 12/2011 | Belmar et al. |
| 2011/0320840 A1 | 12/2011 | Nayar |
| 2012/0099521 A1 | 4/2012 | Ryu |
| 2012/0131248 A1* | 5/2012 | Abali ............ G06F 11/076 710/264 |
| 2013/0080673 A1 | 3/2013 | Feehrer |
| 2013/0104127 A1 | 4/2013 | Domsch |
| 2013/0159579 A1 | 6/2013 | Neiger et al. |
| 2013/0339327 A1 | 12/2013 | Belmar |
| 2014/0047150 A1* | 2/2014 | Marietta ............ G06F 9/5077 710/264 |
| 2014/0157397 A1 | 6/2014 | Dalal |
| 2014/0223060 A1 | 8/2014 | Tsirkin et al. |
| 2015/0006783 A1* | 1/2015 | Chew ............ G06F 12/0815 711/6 |
| 2015/0312116 A1 | 10/2015 | Taheri |
| 2016/0117190 A1* | 4/2016 | Sankaran ............ G06F 13/24 710/267 |
| 2016/0147679 A1 | 5/2016 | Guddeti |
| 2018/0129619 A1 | 5/2018 | Neiger et al. |
| 2018/0349307 A1 | 6/2018 | Auernhammer |
| 2018/0356964 A1 | 12/2018 | Morris |
| 2019/0163519 A1 | 5/2019 | Freeman |
| 2020/0264910 A1 | 8/2020 | Kraemer |
| 2020/0264911 A1 | 8/2020 | Raisch |
| 2020/0264912 A1 | 8/2020 | Raisch |
| 2020/0264917 A1 | 8/2020 | Kraemer |
| 2020/0264992 A1 | 8/2020 | Raisch |
| 2020/0264993 A1 | 8/2020 | Nerz |
| 2020/0264995 A1 | 8/2020 | Raisch |
| 2021/0055945 A1 | 2/2021 | Raisch |
| 2021/0117229 A1 | 4/2021 | Kraemer |

FOREIGN PATENT DOCUMENTS

| | | |
|---|---|---|
| TW | 201430572 A | 8/2014 |
| TW | I537822 B | 11/2016 |
| TW | I570563 B | 11/2017 |
| TW | 201830259 A | 8/2018 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Intel 64 and IA-32 Architectures Software Developer's Manual—vol. 3A; System Programming Guide, Part 1, Sep. 2016, Chapter 10 (10-1-10-50) (+ cover pages).

Williams, Chris, "Intel's Broadwell Xeon E5-2600 v4 chips: So What's in it for you, smartie-pants coders," Mar. 2016, pp. 1-9.

Raj, Ashok, "Recent Enhancements In Intel Virtualization Technology for Directed I/O (Intel VT-D)," Sep. 2018, pp. 1-7.

Raisch, Christoph et al., "Directed Interrupt Virtualization," U.S. Appl. No. 16/789,504, filed Feb. 13, 2020, pp. 1-83.

Kraemer, Marco et al., "Directed Interrupt Virtualization With Interrupt Table," U.S. Appl. No. 16/789,515, filed Feb. 13, 2020, pp. 1-103.

Kraemer, Marco et al., "Directed Interrupt Virtualization With Running Indicator," U.S. Appl. No. 16/789,519, filed Feb. 13, 2020, pp. 1-105.

Nerz, Bernd et al., "Directed Interrupt For Multilevel Virtualization," U.S. Appl. No. 16/789,532, filed Feb. 13, 2020, pp. 1-109.

Raisch, Christoph et al., "Directed Interrupt Virtualization With Blocking Indicator," U.S. Appl. No. 16/789,567, filed Feb. 13, 2020, pp. 1-99.

Raisch, Christoph et al., "Interrupt Signaling For Directed Interrupt Virtualization," U.S. Appl. No. 16/789,581, filed Feb. 13, 2020, pp. 1-101.

Raisch, Christoph et al., "Directed Interrupt Virtualization With Fallback," U.S. Appl. No. 16/789,600, filed Feb. 13, 2020, pp. 1-103.

List of IBM Patents or Patent Applications Treated As Related, May 13, 2020, 2 pages.

Raisch, Christoph et al., "Interrupt Signaling For Directed Interrupt Virtualization," U.S. Appl. No. 17/091,498, filed Nov. 6, 2020, pp. 1-98.

Kraemer, Marco et al., "Directed Interrupt Virtualization with Interrupt Table," U.S. Appl. No. 17/137,755, filed Dec. 30, 2020, pp. 1-103.

List of IBM Patents or Patent Applications Treated As Related, Mar. 30, 2021, 2 pages.

Nerz, Bernd et al., "Directed Interrupt For Multilevel Virtualization," U.S. Appl. No. 17/358,172, filed Jun. 25, 2021, pp. 1-109.

List of IBM Patents or Patent Applications Treated as Related, Jun. 30, 2021, 2 pages.

Raisch, Christoph et al., "Directed Interrupt Virtualization With Fallback." U.S. Appl. No. 17/506,368, filed Oct. 20, 2021, pp. 1-103.

List of IBM Patents or Patent Applications Treated As Related, Oct. 26, 2021, 2 pages.

Nerz, Bernd et al., "Directed Interrupt For Multilevel Virtualization," U.S. Appl. No. 17/358,172, filed Jun. 26, 2021, pp. 1-109.

Raisch, Christoph et al., "Directed Interrupt For Multilevel Virtualization With Interrupt Table," U.S. Appl. No. 17/482,192, filed Sep. 22, 2021, pp. 1-101.

Kraemer, Marco et al., "Directed Interrupt Virtualization With Running Indicator," U.S. Appl. No. 17/482,514, filed Sep. 23, 2021, pp. 1-105.

List of IBM Patents or Patent Applications Treated As Related, Oct. 12, 2021, 2 pages.

Examination Report for AU Application No. 2020222167, dated Dec. 8, 2021 (3 pages).

\* cited by examiner

DIRECTED INTERRUPT FOR MULTILEVEL VIRTUALIZATION WITH INTERRUPT TABLE

This application claims priority from European patent application number EP19157100.9, filed Feb. 14, 2019, which is hereby incorporated herein by reference in its entirety.

BACKGROUND

One or more aspects of the present disclosure relate, in general, to interrupt processing within a computer system, and in particular, to handling interrupts generated by bus connected modules in a multiprocessor computer system.

Interrupts are used to signal to a processor that an event needs the attention of the processor. For example, hardware devices, e.g., hardware devices connected with the processors via a bus, use interrupts to communicate that they require attention from an operating system. In case the receiving processor is currently performing some activities, the receiving processor may in response to receiving an interrupt signal suspend its current activities, save its state, and handle the interrupt, e.g., by executing an interrupt handler. The interruption of the processors' current activities resulting from the receipt is only temporary. After having handled the interrupt, the processor may resume its suspended activities. Thus, interrupts may allow for a performance improvement by eliminating unproductive waiting time of a processor in polling loops, waiting for external events.

In multiprocessor computer systems, interrupt routing efficiency issues may arise. The challenge is to forward interrupt signals sent by hardware devices, like, e.g., bus connected modules, to a processor of the multiple processors assigned for use by the operating system in an efficient way. This may be particularly challenging in case the interrupt is used to communicate with a guest operating system on a virtual machine. A hypervisor or virtual machine monitor (VMM) creates and runs one or more virtual machines, i.e., guest machines. A virtual machine provides a guest operating system executed on the same machine with a virtual operating platform, while hiding the physical characteristics of the underlying platform. Using multiple virtual machines allows to run multiple operating systems in parallel. Since being executed on a virtual operating platform, the guest operating system's view of the processors may in general differ from an underlying, e.g., physical view of the processors. The guest operating system uses virtual processor IDs to identify processors, which in general do not coincide with underlying logical processor IDs. The hypervisor which manages the execution of the guest operating system defines a mapping between underlying logical processor IDs and virtual processor IDs used by the guest operating system. However, this mapping and the selection of processors scheduled for use by the guest operating system are not static, but may be changed by the hypervisor, while the guest operating system is running, without the knowledge of the guest operating system.

This challenge may further increase in case of a non-native, i.e., hosted hypervisor. In this case, the hosted hypervisor itself may run on an underlying guest operating system executed on an underlying native or a further hosted hypervisor. The underlying hypervisor may provide a first mapping of underlying logical processor IDs to first virtual processor IDs used by the underlying guest operating system, while the hosted hypervisor may provide a second mapping of the first virtual processor IDs to second virtual processor IDs. Again, the first and second mapping may in general not be static, but rather be changed dynamically without knowledge of the first and/or second guest operating systems using the first and second virtual processor IDs, respectively.

Typically, this challenge is solved by forwarding interrupt signals using broadcasting. When using the broadcasting, the interrupt signal is successively forwarded between the multiple processors until a processor suitable for handling the interrupt signal is met. However, in case of multiple processors, the probability that a processor receiving the broadcasted interrupt signal first is indeed suitable for handling the interrupt signal may be rather low. Furthermore, being suitable for handling the interrupt signal not necessarily means that the respective processor is the best choice for handling the interrupt.

SUMMARY

Shortcomings of the prior art are overcome and additional advantages are provided through the provision of a computer program product for providing an interrupt signal to a first guest operating system executed using one or more processors of a plurality of processors of a computer system assigned for usage by the first guest operating system. The computer program product comprises at least one storage medium readable by at least one processing circuit and storing instructions for performing a method. The method includes receiving, by a bus attachment device from one bus connected module of a plurality of bus connected modules operationally coupled to the plurality of processors via the bus attachment device, an interrupt signal with an interrupt target ID. The interrupt target ID identifies one processor of the plurality of processors assigned for usage by the first guest operating system as a target processor to handle the interrupt signal. The first guest operating system is implemented using a second guest operating system as a host hosting the first guest operating system. A copy of an interrupt table entry assigned to the interrupt target ID is retrieved by the bus attachment device from an interrupt table stored in a first memory section of a memory operationally connected with the bus attachment device. The first memory section is assigned to the second guest operating system, and the copy of the interrupt table entry comprises a mapping of the interrupt target ID to a logical processor ID. The interrupt target ID is translated by the bus attachment device to the logical processor ID using the copy of the interrupt table entry. The bus attachment device forwards the interrupt signal to the target processor to handle. The forwarding uses the logical processor ID resulting from the translating to address the target processor directly.

Methods and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

In the following, embodiments of aspects of the invention are explained in greater detail, by way of example only, making reference to the drawings in which.

DETAILED DESCRIPTION

Figure 1:
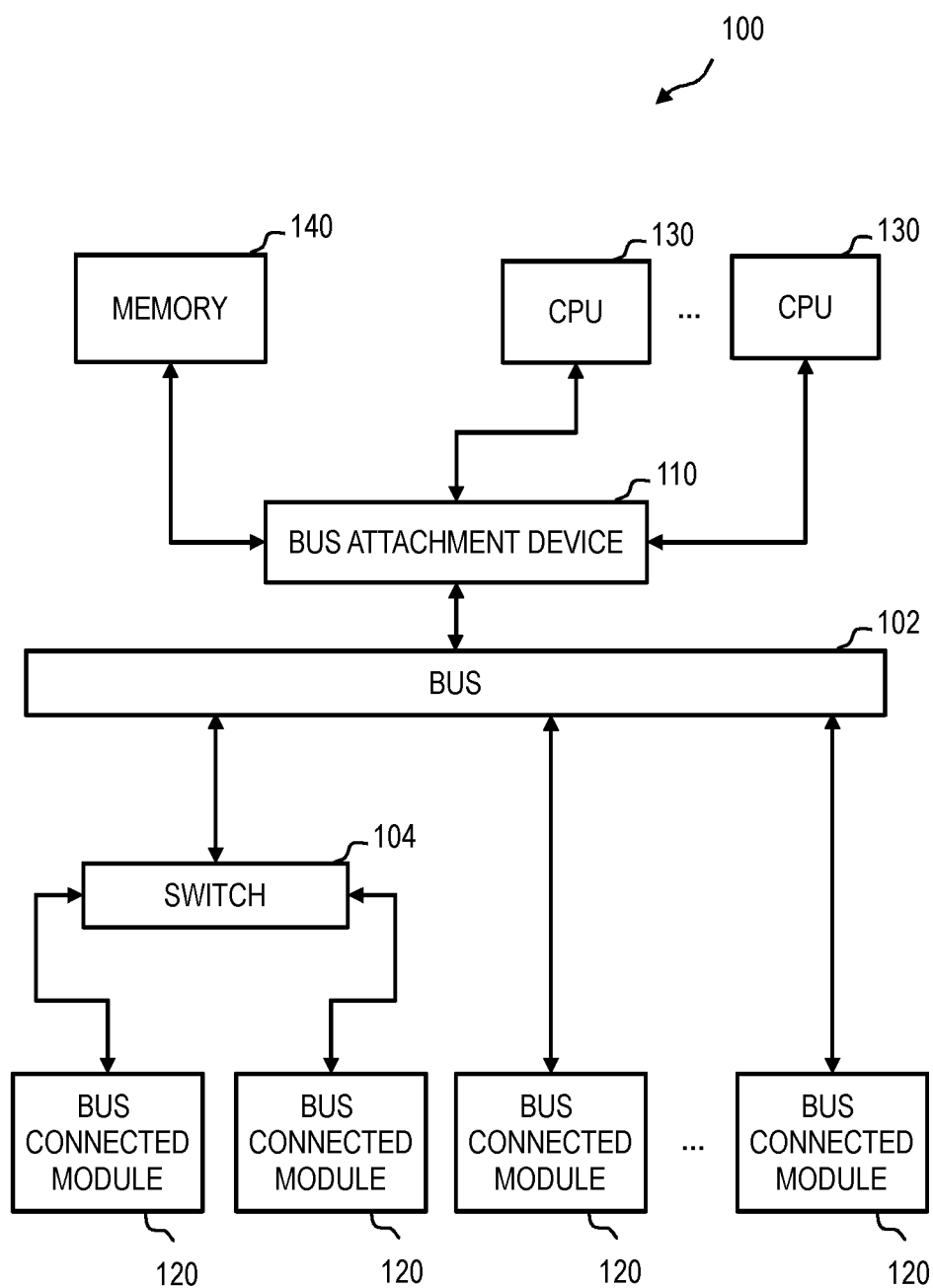
FIG. 1 depicts one example of a schematic diagram of an example computer system.

The descriptions of the various embodiments of aspects of the present invention will be presented for purposes of illustration, but are not intended to be exhaustive or limited to the embodiments disclosed. Many modifications and variations will be apparent to those of ordinary skill in the art without departing from the scope and spirit of aspects of the described embodiments. The terminology used herein was chosen to best explain the principles of the embodiments, the practical application or technical improvement over technologies found in the marketplace, or to enable others of ordinary skill in the art to understand the embodiments disclosed herein.

A first level hypervisor defines a first mapping of logical processor IDs to first virtual processor IDs used by a guest operating system running on a virtual machine provided by the hypervisor. A bus connected module sending requests, e.g., comprising an interrupt signal, for the first level guest operating system may use one of the first virtual processor IDs as a target ID for identifying a target processor for the request. According to embodiments, instead of the first virtual processor ID, also some other unique ID derived using the first virtual processor ID and/or unambiguously assigned to the respective first virtual processor ID may be used.

In case of a second level hypervisor running on a first level guest operating system, the second level hypervisor may provide a virtual machine on which a second level guest operating system is running. The second level hypervisor may further define a second mapping of the first virtual processor IDs, used by the first level guest operating system hosting the second level hypervisor with the second level guest operating system, to second virtual processor IDs for use by the second level guest operating system. A bus connected module sending requests, e.g., comprising an interrupt signal, for the second level guest operating system may use one of the second virtual processor IDs as a target ID for identifying a target processor for the request. According to embodiments, instead of a second virtual processor ID itself also some other unique ID derived using the second virtual processor ID and/or unambiguously assigned to the respective second virtual processor ID may be used.

According to embodiments, a bus connected module, e.g., a PCIe function, may be assigned to, e.g., exactly one second level guest, if not assigned to a first level guest.

Embodiments may have the beneficial effect of minimizing the impact on existing multilevel hypervisor implementations.

Embodiments may have the beneficial effect of enabling the bus attachment device to address the target processor directly. Thus, the interrupt signal may be targeted by the issuing bus connected module selecting a target processor ID to a particular processor, i.e. target processor, of a multiprocessor computer system. For example, a processor may be selected as a target processor for the interrupt signal, which has performed activities related to the interrupt before. Handling the interrupt signal by the same processor as the respective activities may result in a performance advantage, since in case the same processor is also handling the interrupt signal, the data (e.g., all the data) in context with this interrupt may already be available to the processor and/or stored in a local cache enabling a fast access for the respective processor without requiring extensive cache traffic.

Thus, a broadcasting of the interrupt signal may be avoided for which there is no guarantee that the processor which will handle the interrupt in the end is best suited for this task from a performance point of view, like cache traffic minimization. Rather than presenting the interrupt signal to all processors, each processor trying to handle it and one processor wins, the interrupt signal may be provided directly to a target processor increasing the efficiency of the interrupt signal handling.

Embodiments may have the beneficial effect of providing a forwarding mechanism for a multilevel virtualization to supporting direct interrupt forwarding, as well as broadcasting.

Embodiments may have the beneficial effect that an interrupt table assigned to a second level guest operating system is stored in a memory section assigned to a first level guest operating system.

According to embodiments, an interrupt table assigned to the first level guest operating system is stored in an internal section of the memory also referred to as hardware system area (HSA), which is an area of memory reserved for use by hardware. The HSA may comprise a fixed size and be fenced off from client purchased memory, i.e., memory assignable to a host and/or guest operating system.

According to embodiments, an interrupt table entry may be, e.g., required per interrupt target ID used to identify processors. Thus, the amount of memory required for storing an interrupt table correlates with the number of interrupt target IDs and may increase to a size difficult to be handled using the HSA.

Embodiments may further provide security checks to prevent errors due to unallowed changes of interrupt table entries by the first level guest operating system or the hypervisor, including end of interrupt signaling from the operating system to the hardware. Since by storing the interrupt table in a section of memory assigned to the first level operating system, a risk of changes of the interrupt table by the first level operating system may arise.

According to embodiments, an interrupt table providing a mapping between interrupt target IDs and logical processor IDs is stored in a section of the memory assigned to an n-level guest operating system with n≥1, e.g., 1 or 2. A device table stored in an internal section of the memory, reserved for hardware, may comprise an entry assigned to the bus connected module providing an address indicator, e.g., a pointer, indicating a memory address of the interrupt table (IRT) in the memory section assigned to the n-level guest operating system, e.g. the first level guest operating system.

Embodiments may have the beneficial effect of providing an interrupt table (IRT) comprising interrupt table entries (IRTE), each entry providing a mapping of an interrupt target ID to a logical processor ID. Thus, the entries may define a unique assignment for each interrupt target ID to a logical processor ID. According to embodiments, the interrupt target ID may be provided in a form of a virtual processor ID. According to embodiments, the interrupt target ID may be any other ID used by the guest operating system to identify individual processors used.

According to embodiments, the IRT is provided in the memory for use by the bus attachment device to map interrupt target IDs to logical processor IDs. According to embodiments, the IRT may be provided in a single location. An address indicator, e.g., a pointer, indicating a memory address of the IRT may be provided. The address indicator may, for example, be provided by an entry of a device table fetched from the memory by the bus attachment device. Embodiments may have the beneficial effect that no large mapping tables have to be stored in the bus attachment device. The interrupt table used for the mapping may rather be stored in the memory and accessed by the bus attachment device, e.g., if necessary. Thus, the bus attachment device may only have to handle a working copy of one or more interrupt table entries for each interrupt signal to be forwarded. The number of interrupt table entries may, e.g., be small, e.g. one.

According to embodiments, the IRT or individual IRTE may be updated upon a rescheduling of the processors.

An interrupt mechanism may be implemented using directed interrupts. The bus attachment device may be enabled to directly address a target processor using a logical processor ID of the same processor, when forwarding an interrupt signal for handling to its target processor defined by the issuing bus connected module. Translating interrupt target IDs to logical processor IDs by the bus connected device may further ensure that from a point of view of the guest operating system the same processor is addressed, even though the mapping between interrupt target IDs and logical processor IDs or the selection of processors scheduled for use by the guest operating system may be changed by the hypervisor.

In accordance with an embodiment, the interrupt signals are received in a form of message signaled interrupts comprising the interrupt target ID of the target processor. Using message signaled interrupts (MSI) is a method for a bus connected module, such as a Peripheral Component Interconnect (PCI) or Peripheral Component Interconnect express (PCIe) function, to generate a central processing unit (CPU) interrupt in order to notify a guest operating system using the respective central processing unit of the occurrence of an event or the presence of some status. MSI provides an in-band method of signaling an interrupt, using special in-band messages, thereby avoiding a need for dedicated paths separated from a main data path to send such control information, such as dedicated interruption pins on each device. MSI rather relies on exchanging special messages indicating interrupts through the main data path. When a bus connected module is configured to use MSI, the respective module requests an interrupt by performing an MSI write operation of a specified number of bytes of data to a special address. The combination of this special address, i.e., MSI address, and a unique data value, i.e. MSI data, is termed an MSI vector.

Modern PCIe standard adapters have the capability to present multiple interrupts. MSI-X, for example, permits a bus connected module to allocate up to 2048 interrupts. Thus, targeting individual interrupts to different processors, such as in a high-speed networking application relying on multiprocessor systems, is enabled. MSI-X allows to assign a multitude of interrupts, each with an individual MSI address and MSI data value.

For transmitting an interrupt signal, an MSI-X message may be used. The required content of the MSI-X message may be determined using an MSI-X data table. The MSI-X data table local to the bus connected module, i.e. PCIe adapter/function, may be indexed by a number assigned to each interrupt signal, also referred to as an interrupt request (IRQ). The MSI-X data table content is under control of the guest operating system and may be set to the operating system by guidance of hardware and/or firmware. A single PCIe adapter may comprise multiple PCIe functions, each of which may have an independent MSI-X data table. This may, for example, be the case for a single root input/output virtualization (SR-IOV) or multi-function devices.

An interrupt target ID, like, e.g., a virtual processor ID, may be directly encoded as part of a message sent by the bus connected module, like, e.g., an MSI-X message, comprising the interrupt signal. The message, e.g., an MSI-X message, may comprise a requestor ID, i.e. an ID of the bus connected module, the aforementioned interrupt target ID, a DIBV (directed interrupt signal vector) or an AIBV (interrupt signal vector) index, an MSI address and MSI data. An MSI-X message may provide, e.g., 64 bits for the MSI address and, e.g., 32 bits for the data. A bus connected module may request an interrupt using MSI by performing an MSI write operation of a specific MSI data value to a special MSI address.

The device table is, for instance, a shared table which may be fully indexed by the requestor ID (RID) of the interrupt requestor, i.e., the bus connected module. The bus attachment device remaps and posts the interrupt, i.e., the bus attachment device translates the interrupt target ID and uses the same to directly address the target processor.

A guest operating system may use virtual processor IDs to identify processors in a multiprocessor computer system. Thus, the guest operating system's view of processors may not be identical to a view of an underlying system using logical processor IDs. Bus connected modules providing resources used by a guest operating system may use virtual processor IDs as the resources for communicating with the guest operating system, like, e.g., an MSI-X data table, may be under the control of the guest operating system. As an alternative to a virtual processor ID, any other ID may be defined for the bus connected module to address the processors.

The interrupt is presented to the guest operating system or other software executed thereon, such as other programs, etc. As used herein, the term operating system includes operating system device drivers.

As used herein, the term bus connected module may comprise any type of bus connected module. According to embodiments, the module may be a hardware module, like, e.g., a storage function, processing module, network module, cryptographic module, PCI/PCIe adapter, other type of input/output module, etc. According to other embodiments, the module may be a software module, i.e., a function, like, e.g., a storage function, processing function, network function, cryptographic function, PCI/PCIe function, other type of input/output function, etc. Thus, in the examples presented herein, module is used interchangeably with function, e.g., PCI/PCIe function, and adapter, e.g., PCI/PCIe adapter, unless otherwise noted.

Embodiments may have the benefit that an interrupt signal routing mechanism, e.g., MSI-X message routing mechanism, is provided which allows it to keep bus connected modules, e.g., PCIe adapters and functions, as well as device drivers used to operate or control the bus connected modules, unchanged. Furthermore, the hypervisor may be kept from intercepting the underlying architecture for implementing communication between bus connected modules and a guest operating system, e.g., PCIe MSI-X architecture. In other words, changes to the interrupt signal routing mechanism may be implemented outside the hypervisor and bus connected modules.

In accordance with an embodiment, the memory comprises in a second memory section assigned to the first guest operating system a directed interrupt summary vector with a directed interrupt summary indicator per interrupt target ID. Each directed interrupt summary indicator is assigned to an interrupt target ID indicating whether there is a first interrupt signal addressed to the respective interrupt target ID to be handled. The memory comprises in the second memory section a forwarding vector comprising a first set of forwarding vector entries. The first set of forwarding vector entries comprises for each of the directed interrupt summary indicators of the directed interrupt summary vector a forwarding vector entry assigned to the respective directed interrupt summary indicator. Each forwarding vector entry indicates whether the respective directed interrupt summary indicator to which it is assigned is to be updated in order to indicate for the first operating system that there is a first interrupt signal addressed to the respective interrupt target ID to be handled. The method further comprises: checking by the bus attachment device whether the target processor is scheduled for usage by the first guest operating system; and if the target processor is scheduled for usage by the first guest operating system, the translating and direct forwarding are performed, else forwarding by the bus attachment device the first interrupt signal for handling to the first operating system using broadcasting. The broadcasting comprises selecting by the bus attachment device a forwarding vector entry of the first set of forwarding vector entries which is assigned to the received interrupt target ID and updating the selected forwarding vector entry such that it indicates that the directed interrupt summary indicator to which it is assigned is to be updated in order to indicate for the first operating system that there is a first interrupt signal addressed to the respective interrupt target ID to be handled.

Embodiments may have the beneficial effect of enabling an effective exchange of information regarding interrupt signals between guest operating systems of different virtualization levels. This may in particular be advantageous in case of a broadcast with a guest operating system as a host taking over the handling of an interrupt signal.

According to embodiments, one or more forwarding vectors are provided by the first level operating system. The forwarding vectors are stored in a memory section reserved for usage by the first level operating system. The number of forwarding vectors may depend on the number of second level operating systems running on the second level hypervisor. A forwarding vector per second level guest operating system may be provided with each forwarding vector being assigned to one of the second level guest operating systems. The entries of the forwarding vectors may be used to indicate that there is an interrupt signal to be handled by the second level guest system to which the respective forwarding vector is assigned.

The entries of the forwarding vectors may each reference entries of one or more interrupt summary vectors assigned to second level guest operating systems. Each interrupt summary vector is stored in a memory section reserved for usage by the second level operating system the respective interrupt summary vector is assigned to.

A forwarding vector comprises entries assigned to interrupt target IDs used by the one or more bus connected modules to identify as targets of interrupt signals target processors assigned for use by a second level guest operating system the respective forwarding vector is assigned to. These entries of the respective forwarding vector, in addition, each reference an entry of the interrupt summary vectors of the second level guest operating systems assigned to the same target processor. Interrupt summary vectors with entries assigned to individual target processors may be used as direct interrupt summary vectors, since their entries provide direct references to individual target processors.

An entry of the forwarding vector assigned to a target processor identified by a target ID may be updated by the bus attachment device to indicate that there is an interrupt signal to be handled by the second level guest system using the respective target processor. Based on the reference to an entry of the direct interrupt summary vector in the memory section of the second level guest operating system, it may be determined whether there is an interrupt signal to be handled by a target processor assigned for usage by the second level guest operating system. For example, from the position of the referenced entry in the direct interrupt summary vector the interrupt target ID of the target processor may be determinable.

Embodiments may have the beneficial effect that two at least partially similar vector structures are provided, one for the first level guest operating system, i.e., the forwarding vector, and the other for the second level guest operating system, i.e., the direct interrupt summary vector. Both vector structures comprise entries assigned to each other, as well as to a target processor. Thus, by the entries of the two vector structures, information is provided for each of the guest operating systems regarding for which processors there are interrupt signals to be handled. In case no processor assigned for use by the second level operating system is available, the first level operating system may take over and determine based on the forwarding vector for which target processor assigned for use by the second level operating system an interrupt signal to be handled is targeted. In case the target processor is deactivated, the first level operating system may trigger a scheduling of the target processor such that it may handle the respective interrupt signal.

When an interrupt cannot be delivered directly, e.g., because the hypervisor has not scheduled the target processor, the guest operating system may benefit by delivering the interrupt with the originally intended affinity, i.e. information for which processor the interrupt was intended, using broadcast. In this case, the bus attachment device may set a bit specifying the target processor in the DISB (direct interrupt summary vector) after setting the DIBV (direct interrupt signal vector) and before delivering a broadcast interrupt request to the guest operating system. If a guest operating system receives a broadcast interrupt request, it may therefore identify by scanning and unenabling direct interrupt summary indicators in the DISB, e.g., scanning and resetting direct interrupt summary bits, which target processors have an interrupt signal pending as signaled in a DIBV. The guest operating system may thus be enabled to decide whether the interrupt signal is handled by the current processor which received the broadcast or further forwarded to the original target processor.

According to embodiments, a forwarding vector for each second level guest operating system, herein also referred to as a forwarding DISB vector, may be provided in a section of memory assigned to the first level guest operating system.

The referencing between the forwarding vector and the direct interrupt summary vector, herein also referred to as a DISB vector, and/or interrupt summary vector, herein also referred to as an AISB vector, may be implemented using a guest interrupt table (GAIT) and/or a guest interrupt state area (GISA), both provided in a section of the memory assigned to the first level guest operating system.

For example, each entry of the forwarding vector may be referencing an entry in the GAIT. The GAIT entries may each comprise a memory address indicator indicating an entry of a DISB vector or an entry of an AISB vector of the second level guest operating system. The GAIT entries may furthermore provide interrupt subclass IDs of the second level guest operating system for interrupt requests directed to the second level guest operating system. Furthermore, a GISA (guest interrupt state area) per guest may be provided which hosts pending interrupt indicators of floating interrupt requests directed to the second level guest operating system per interrupt subclass of the second level guest operating system.

An individual entry, e.g., bit, in a forwarding DISB may represent an activity, i.e., interrupt, for an individual target processor, which may be assigned to an individual second level guest operating system.

Furthermore, the forwarding DISB may comprise additional entries, e.g., additional bits, each of which may represent an activity, i.e., interrupt request, of an individual bus connected module, e.g., PCIe function, which may be assigned to an individual second level guest operating system.

Firmware of the processors, e.g., millicode, may wake up a second level guest operating system and enable an entry in a DISB vector of the respective second level guest operating system by scanning the forwarding DISB provided by the first level guest operating system and a data lookup in the GAIT indicating which entry in the DISB vector of the respective second level guest operating system is to be set in order to reflect the information regarding for which target processor there is an interrupt to be handled by the awoken second level guest operating system.

Using this mechanism, it may be mapped from any forwarding vector entry to any entry of a DISB vector of the same second level guest operating system to which the forwarding vector is assigned as well.

According to embodiments, an entry in a DISB vector of the first level guest operating system may only need to be enabled, e.g., a bit set, if the target processor for use by the first level guest operating system and assigned to the respective entry is not running and a broadcast is initialized.

This mechanism may be re-used to enable an entry in a DISB vector of the second level guest operating system using a forwarding DISB vector assigned to the same second level guest operating system and provided by the first level guest operating system. An entry of the forwarding DISB vector referencing an entry of the DISB vector of the second level guest operating system assigned to an individual target processor may, e.g., only need to be enabled, e.g., a bit set, if the target processor is not running and a broadcast is initialized.

This mechanism may therefore effectively map interrupt target IDs used by the first level guest operating system to interrupt target IDs used by the second level guest operating system.

According to embodiments, the forwarding vector may comprise entries assigned to individual bus connected modules, as well as entries assigned to individual target processors.

In accordance with an embodiment, the first memory section further comprises a guest interrupt table. The guest interrupt table comprises a first set of guest interrupt table entries. The first set of guest interrupt table entries comprises a directed interrupt summary address indicator for each of the directed interrupt summary indicators of the directed interrupt summary vector with the respective directed interrupt summary address indicator indicating a memory address of the respective directed interrupt summary indicator in the second memory section. The assignments of the forwarding vector entries of the first set of forwarding vector entries are implemented, e.g., using the guest interrupt table with each forwarding vector of the first set of forwarding vector entries being assigned a guest interrupt table entry of the first set of guest interrupt table entries. A directed interrupt summary address indicator of the respective guest interrupt table entry indicating the memory address of the directed interrupt summary to which the respective forwarding vector entry is assigned.

In accordance with an embodiment, each of the forwarding vector entries is implemented as a single bit. Embodiments may have the beneficial effect that the forwarding vector entries are provided in a form with minimum memory space and is fast and efficiently processable. In accordance with an embodiment, the directed interrupt summary vector is implemented as a contiguous area in memory. Embodiments may have the beneficial effect that a directed interrupt summary vector is provided in a form with minimum memory space and is fast and efficiently processable. The contiguous area may, e.g., be a cache line. In accordance with an embodiment, each of the directed interrupt summary indicators is implemented as a single bit. Embodiments may have the beneficial effect that the directed interrupt summary indicators are provided in a form with minimum memory space and is fast and efficiently processable.

According to embodiments, a double fetch of the IRTE may be performed, in order to prevent the interrupt signal from being sent to a processor which, e.g., has been deactivated in the meantime. According to embodiments, after forwarding the interrupt signal to the processor identified by the logical processor ID resulting from the translation of the interrupt target ID using a first copy of the IRTE, a second copy of the same IRTE may be fetched to check whether in the meantime any changes of the IRTE took place. In case the IRTE has been updated in the meantime, there is a risk that the interrupt signal has been forwarded to a deactivated processor. Therefore, the second copy of the IRTE may be used to translate the interrupt target ID again and forward the interrupt signal to the processor identified by the logical processor ID resulting from the second translation. According to an alternative embodiment, the complete method starting with the fetching of the first copy of the IRTE may be repeated in case the second copy of the IRTE does not match the first copy. For example, a third copy of the IRTE may be fetched replacing the first copy of the IRTE or the second copy of the IRTE may replace the first copy of the IRTE and a third copy of the IRTE may be fetched to implement a double fetch scheme also for the partial repetition of the method. This scheme may be repeated until a match is achieved. According to further alternative embodiments, the interrupt signal may be forwarded using broadcasting in case the second copy of the IRTE does not match the first copy. According to embodiments, the bus attachment device participates in the memory-cache-coherence protocol and detects alternations on the IRTE, e.g., cache snooping, by the same mechanism CPUs may detect cache-line-alternations.

Embodiments may have the beneficial effect of avoiding cache purges which may have an inefficient scaling. The double fetch may be global or specific to an IRTE, i.e., the whole entry may be subject to the double fetching or restricted to specific information comprised by the respective entry.

According to embodiments, the condition resulting from the time required for translating the interrupt target ID and forwarding the interrupt signal to the target processor, until it reaches the processor may be caught by a checking logic on the CPU checking whether the receiving processor is still the correct target processor. For the check, an interrupt target ID and/or logical partition ID received with the interrupt request may be compared with a current interrupt target ID and/or logical partition ID assigned to the receiving processor as a reference. In case of a match, the receiving processor directly addressed using the logical processor ID resulting from the translation using the copy of the IRTE is indeed the correct target processor. Thus, the information provided by the copy of the IRTE has been up-to-date. In case of a mismatch, the copy of the IRTE has not been up-to-date and the receiving processor is not the target processor anymore. In case of a mismatch, the interrupt signal may, e.g., be forwarded to the target operating system using broadcasting.

According to embodiments, there may be three entities operating in parallel, i.e. the bus attachment device and the target processor processing the interrupt signal, as well as the hypervisor which may change the assignments between interrupt target IDs and logical processor IDs. According to embodiments, there may be no central synchronization point in physically distributed systems besides memory which provides a virtual appearance of such a system at a latency cost. Embodiments using a double fetch scheme may have the beneficial effect of providing a method which is optimized for speed vs preventing double deliveries or even misses of interrupt requests.

In view of the interrupt signal, the following actions may be performed: A1) Reading a first copy of the IRTE, A2) Sending an interrupt request to a processor directly addressed, and A3) Reading a second copy of the IRTE. Simultaneously, the following sequence regarding a change of assignment between an interrupt target ID and a logical processor ID may occur: B1) Activate additional processor with additional logical processor ID and deactivate previous processor with previous logical processor ID, and B2) Update IRTE with additional logical processor ID, i.e., replacing the previous logical processor ID by additional logical processor ID.

In certain error cases, a processor, e.g., the target processor, may be reset to a checkpoint and lose intermediate information. In order to regain the lost information, the processor may scan IRTE entries (e.g., all IRTE entries) for this specific processor, i.e. assigned to its logical processor ID, and deliver direct interrupt requests as indicated by the pending direct interrupt indicators, e.g., dPIA bits, present in memory which does not get impacted by a processor recovery.

The pending direct interrupt indicator comprised by the IRTE, e.g., IRTE.dPIA bit, may be used as a main copy, i.e., a single point of truth, if an interrupt signal should be presented. In order to simplify processor recovery, a pending direct interrupt indicator in the processor may be used, e.g., as a shadow-copy of the IRTE.dPIA bit to keep direct interrupts pending on the processor.

In case the memory has a strictly ordered nature, e.g., only the following sequences may be possible in view of steps A1, A2, and B1: alternative 1 with A1→A3→B1 and alternative 2 with A1→B1→A3. In case of alternative 1, the first and the second copy of the IRTE may match. Thus, the interrupt signal may be forwarded to the previous processor instead of the current target processor. The previous processor may see a mismatch regarding the interrupt target ID and/or logical partition ID and initiate a broadcast of the received interrupt signal. In case of alternative 2, the bus attachment device may see a mismatch between the first and the second copy of the IRTE. In response to the mismatch, the bus attachment device may broadcast the interrupt signal. Due to the broadcasting, the interrupt signal may be received by the additional processor which sees a hit and directly processes the received interrupt request. Embodiments may have the beneficial effect of closing the timing window through an over-initiative-approach.

In accordance with an embodiment, the retrieved copy of the interrupt table entry further comprises a forwarding vector entry address indicator indicating a memory address of the forwarding vector entry assigned to the received interrupt target ID in the first memory section. The method further comprises using by the bus attachment device the forwarding vector entry address indicator comprised by the retrieved copy of the interrupt table entry for the identifying of the forwarding vector entry assigned to the received interrupt target ID.

In accordance with an embodiment, the retrieved copy of the interrupt table entry further comprises a running indicator indicating whether the target processor identified by the interrupt target ID is scheduled for usage by the first guest operating system. The method further comprises using by the bus attachment device the running indicator comprised by the copy of the interrupt table entry for checking whether the target processor is scheduled for usage by the first guest operating system.

Embodiments may have the beneficial effect of preventing interrupts targeted at a processor not running, i.e., not scheduled for usage by the guest operating system. Embodiments may have the beneficial effect of supporting the hypervisor to reschedule processors.

A running indicator indicates whether the target processor identified by the interrupt target ID received with an interrupt signal is scheduled for usage by the guest operating system. The running indicator may, for example, be implemented in a form of a running bit, i.e., a single bit indicating whether a processor assigned with the respective bit is running, i.e., is scheduled for usage by the guest operating system. Thus, an enabled running bit may tell the bus attachment device that the target processor is currently scheduled, while an unenabled running bit may tell the bus attachment device that the target processor is currently not scheduled. In case the target processor is not running, the bus attachment device may send a fallback broadcast interrupt request right way, without trying to address one of the processors directly.

According to embodiments a direct interrupt blocking indicator is introduced in the interrupt entries of an interrupt table in memory. The direct interrupt blocking indicator may be implemented in a form of a single bit, i.e., a dIBPIA bit.

According to embodiments, the IRTE is fetched from the memory, and a running indicator is checked in order to determine whether the target processor is scheduled. In case the target processor is scheduled, a direct interrupt blocking indicator is enabled, in order to block the target processor from receiving further interrupt signals, while handling the current interrupt signal. A further interrupt signal may otherwise interfere with the handling of the current interrupt signal. In order to ensure that the target processor has not been rescheduled in the meanwhile, the IRTE is re-fetched and the current running indicator is checked again in order to determine whether the target processor is still scheduled. In case the target processor is still scheduled, the interrupt signal may be forwarded to the target processor using a logical processor ID of the target processor to address the target processor directly. In addition, it may be checked whether the logical processor ID of the target processor provided by the IRTE for the received interrupt target ID is still the same.

In accordance with an embodiment, the retrieved copy of the interrupt table entry further comprises a first logical partition ID identifying a logical partition to which the first guest operating system is assigned and a first guest interrupt state area address indicator indicating a memory address of a guest interrupt state area assigned to the first guest operating system in the first memory section.

In accordance with an embodiment, the guest interrupt state area assigned to the first guest operating system comprises a pending interrupt indicator indicating whether a first interrupt signal for handling by the first operating system using broadcasting is pending. The method further comprises if the first interrupt signal is forwarded using broadcasting, updating by the bus attachment device the pending interrupt indicator such that the updated pending interrupt indicator indicates that a first interrupt signal for handling by the first operating system using broadcasting is pending. Embodiments may have the beneficial effect of providing an effective method for monitoring pending interrupts.

In accordance with an embodiment, the method further comprises retrieving by the bus attachment device a copy of a device table entry from a device table. The device table entry comprising an interrupt table address indicator indicating a memory address of the interrupt table. The bus attachment device uses the memory address of the interrupt table for the retrieving of the first copy of the interrupt table entry.

In accordance with an embodiment, the device table is stored in a third memory section of the memory. The third memory section is protected against accesses by the first and second operating system. This section may, e.g., be a HSA, ensuring that the device table is prevented from being tampered with by any guest operating system.

In accordance with an embodiment, the retrieved copy of the device table entry further comprises a second logical partition ID identifying the logical partition to which the first guest operating system is assigned and a second guest interrupt state area address indicator indicating the memory address of the guest interrupt state area assigned to the first guest operating system in the first memory section. The method further comprises checking by the bus attachment device that the interrupt table entry stored in the first memory section accessible by the second guest operating system is unchanged by the second guest operating system using a comparison of a first combination of the first logical partition ID and the first guest interrupt state area address indicator provided by the interrupt table entry and a second combination of a second logical partition ID and a second guest interrupt state area address indicator provided by the device table entry stored in the protected third memory section. A match of the first and second combination indicating that the interrupt table entry is unchanged.

Embodiments may have the beneficial effect of providing a security mechanism to exclude that the interrupt table has been tampered.

In accordance with an embodiment, the device table entry further comprises a logical partition ID identifying a logical partition to which the guest operating system is assigned, and the forwarding of the first interrupt signal by the bus attachment device further comprises forwarding with the first interrupt signal the logical partition ID. Embodiments may have the beneficial effect of enabling the receiving processor to check to which guest operating system an interrupt signal is addressed.

In accordance with an embodiment, the device table entry further comprises an interrupt subclass ID identifying an interrupt subclass to which the first interrupt signal is assigned, and the forwarding of the first interrupt signal by the bus attachment device further comprises forwarding with the first interrupt signal the interrupt subclass ID.

In accordance with an embodiment, the second memory section further comprises a directed first interrupt signal vector per interrupt target ID assigned to the respective interrupt target ID. Each directed first interrupt signal vector comprises a first interrupt signal indicator per first bus connected module assigned to the first bus connected module, and each directed first interrupt signal vector indicates whether there is a first interrupt signal issued by the first bus connected module and addressed to the respective interrupt target ID to be handled. The method further comprises: selecting by the bus attachment device the directed first interrupt signal vector assigned to the interrupt target ID to which the first interrupt signal is addressed; selecting by the bus attachment device in the selected directed first interrupt signal vector the directed first interrupt signal indicator assigned to the first bus connected module which issued the first interrupt signal; and updating by the bus attachment device the selected directed first interrupt signal indicator such that the updated directed first interrupt signal indicator indicates that there is a first interrupt signal issued by the first bus connected module and addressed to the respective interrupt target ID to be handled.

The directed interrupt signal vectors are ordered depending on the target processor ID, i.e., optimized for taking track of directed interrupts. In other words, an order criterium is the target processor IDSs rather than requestor IDs identifying the issuing bus connected modules. Each directed interrupt signal vector may comprise one or more directed interrupt signal indicators depending on the number of bus connected modules.

An ordering of interrupt signal indicators, e.g., in a form of interrupt signaling bits, indicating an individual interrupt signal has been received, e.g., in a form of an MSI-X message, sequentially within a contiguous area of memory, like a cache line, for an individual bus connected module, like e.g., a PCIe function, may thus be avoided. Enabling and/or unenabling an interrupt signal indicator, e.g., by setting and/or resetting an interrupt signaling bit, requires, for instance, the respective contiguous area of memory to be moved to one of the processors to change the respective interrupt signal indicator accordingly.

It may be intended that a processor handle, e.g., all indicators for which it is responsible from a guest operating system perspective, i.e., in particular, e.g., all indicators assigned to the respective processor. This may enable a performance advantage, since in case each processor is handling, e.g., all data assigned to the same processor a likelihood that data required in this context is provided to the processor and/or stored in a local cache may be high enabling a fast access to the respective data for the processor without requiring extensive cache traffic.

However, each processor trying to handle, e.g., all indicators for which it is responsible may nevertheless lead to a high cache traffic between the processors, as each processor is to write, e.g., all cache lines for, e.g., all functions, since the indicators assigned to each individual processor may be distributed over, e.g., all contiguous areas, such as cache lines.

The interrupt signaling indicators may be reordered in a form of directed interrupt signaling vectors such that, e.g., all interrupt signaling indicators assigned to the same interrupt target ID are combined in the same contiguous area of memory, e.g., cache line. Thus, a processor intending to handle indicators assigned to the respective processor, i.e., interrupt target ID, may, e.g., only have to load a single contiguous area of memory. Thus, a contiguous area per interrupt target ID is used rather than a contiguous area per bus connected module. Each processor may, e.g., only need to scan and update a single contiguous area of memory, e.g., a cache line for, e.g., all interrupt signals received from, e.g., all available bus connected modules targeted to that specific processor as a target processor identified by the interrupt target ID.

According to embodiments, an offset may be applied by the hypervisor for a guest operating system to align bits to different offsets.

In accordance with an embodiment, the second memory section further comprises an interrupt summary vector with an interrupt summary indicator per bus connected module, each interrupt summary indicator is assigned to a bus connected module indicating whether there is an interrupt signal issued by the respective bus connected module to be handled. The forwarding vector comprises a second set of forwarding vector entries. The second set of forwarding vector entries comprises for each of the interrupt summary indicators of the interrupt summary vector a forwarding vector entry assigned to the respective interrupt summary indicator. Each forwarding vector entry indicates whether the respective interrupt summary indicator to which it is assigned is to be updated in order to indicate for the first operating system that there is a first interrupt signal issued by the respective bus connected module to be handled. The method further comprises receiving by the bus attachment device a second interrupt signal from a second bus connected module with an interrupt target ID, the interrupt target ID identifying one of the processors assigned for usage by the first guest operating system as a second target processor for handling the second interrupt signal; checking by the bus attachment device whether the second target processor is scheduled for usage by the first guest operating system; if the second target processor is scheduled for usage by the first guest operating system, translating by the bus attachment device the received interrupt target ID to a logical processor ID and forwarding the second interrupt signal to the second target processor for handling using the logical processor ID resulting from the translation to address the second target processor directly; else forwarding by the bus attachment device the second interrupt signal for handling to the first operating system using broadcasting, the broadcasting comprising selecting by the bus attachment device a forwarding vector entry of the second set of forwarding vector entries which is assigned to the received interrupt target ID and updating the selected forwarding vector entry such that it indicates that the interrupt summary indicator to which it is assigned is to be updated in order to indicate for the first operating system that there is a first interrupt signal issued by the second bus connected module to be handled.

According to embodiments, the forwarding vector may further comprise additional entries assigned to individual bus connected modules. These additional entries may thus indicate from which bus connected modules there are interrupt signals to be handled. These additional entries of the respective forwarding vector may furthermore each reference an entry of the interrupt summary vectors of the second level guest operating systems assigned to the same bus connected module.

An entry of the forwarding vector assigned to a bus connected module may be updated by the bus attachment device to indicate that there is an interrupt signal from the respective bus connected module to be handled by the second level guest system. Based on the reference to an entry of the direct interrupt summary vector in the memory section of the second level guest operating system, it may be determined from which bus connected modules there are interrupt signals to be handled by the second level guest operating system. For example, from the position of the referenced entry in the interrupt summary vector, the bus connected modules which issued the respective interrupt signal may be determinable.

In accordance with an embodiment, the guest interrupt table comprises a second set of guest interrupt table entries. The second set of guest interrupt table entries comprises an interrupt summary address indicator for each of the interrupt summary indicators of the interrupt summary vector with the respective interrupt summary address indicator indicating a memory address of the respective interrupt summary indicator in the second memory section. The assignments of the forwarding vector entries of the second set of forwarding vector entries are implemented, e.g., using the guest interrupt table with each forwarding vector of the second set of forwarding vector entries being assigned a guest interrupt table entry of the second set of guest interrupt table entries. A directed interrupt summary address indicator of the respective guest interrupt table entry indicating the memory address of the interrupt summary indicator to which the respective forwarding vector entry is assigned.

In accordance with an embodiment, the second memory section further comprises an interrupt signal vector per bus connected module assigned to the respective bus connected module. Each interrupt signal vector comprises an interrupt signal indicator per interrupt target ID assigned to the respective bus connected module, and each interrupt signal vector indicates whether there is an interrupt signal issued by the respective bus connected module and addressed to the respective interrupt target ID to be handled. The method further comprises: selecting by the bus attachment device the directed interrupt signal vector assigned to the second bus connected module; selecting by the bus attachment device in the selected interrupt signal vector the interrupt signal indicator assigned to the interrupt target ID to which the second interrupt signal is addressed; and updating by the bus attachment device the selected interrupt signal indicator such that the updated interrupt signal indicator indicates that there is an interrupt signal issued by the second bus connected module and addressed to the respective interrupt target ID to be handled.

In accordance with an embodiment, the first guest operating system is a guest operating system of a second level of virtualization and the second guest operating system is a guest operating system of a first level of virtualization. In accordance with an embodiment, the first guest operating system is a guest operating system of a third level of virtualization and the second guest operating system is a guest operating system of a second level of virtualization.

Embodiments may have the beneficial effect of enabling multilevel virtualization schemes.

According to embodiments, the instructions provided on the computer readable non-transitory medium for execution by a processing circuit are configured for performing any of the embodiments of the method for providing an interrupt signal to a guest operating system, as described herein.

According to embodiments, the computer system is further configured to execute any of the embodiments of the method for providing an interrupt signal to a guest operating system, as described herein.

FIG. 1 depicts an example computer system 100 for providing an interrupt signal to a guest operating system. The computer system 100 comprises a plurality of processors (e.g., CPUs) 130, which are used to execute a guest operating system. The computer system 100 furthermore includes a memory 140, also referred to as storage memory or main memory. Memory 140 may provide memory space, i.e. memory sections, assigned for use by hardware, firmware, and software components comprised by computer system 100. Memory 140 may be used by hardware and firmware of computer system 100, as well as by software, e.g., hypervisors, host/guest operating systems, application programs, etc. One or more bus connected modules 120 are operationally connected with the plurality of processors 130, as well as memory 140, via a bus 102 and a bus attachment device 110. The bus attachment device 110 manages the communication between bus connected modules 120 on one hand and processors 130, as well as memory 140, on the other hand. Bus connected modules 120 may be connected with the bus 102 directly or via one or more intermediate components, like, e.g., a switch 104.

The bus connected modules 120 may, e.g., be provided in a form of Peripheral Component Interconnect express (PCIe) modules, also referred to as a PCIe adapter or PCIe functions provided by a PCIe adapter. A PCIe function 120 may issue a request which is sent to a bus attachment device 110, e.g., a PCI Host Bridge (PHB), also referred to a PCI Bridge Unit (PBU). The bus attachment device 110 receives the requests from the bus connected modules 120. The requests may, for example, comprise an input/output address that is used to perform a direct memory access (DMA) to memory 140 by the bus attachment device 110 or an input/output address that indicates an interrupt signal, e.g., a message signaled interrupt (MSI).

Figure 2:
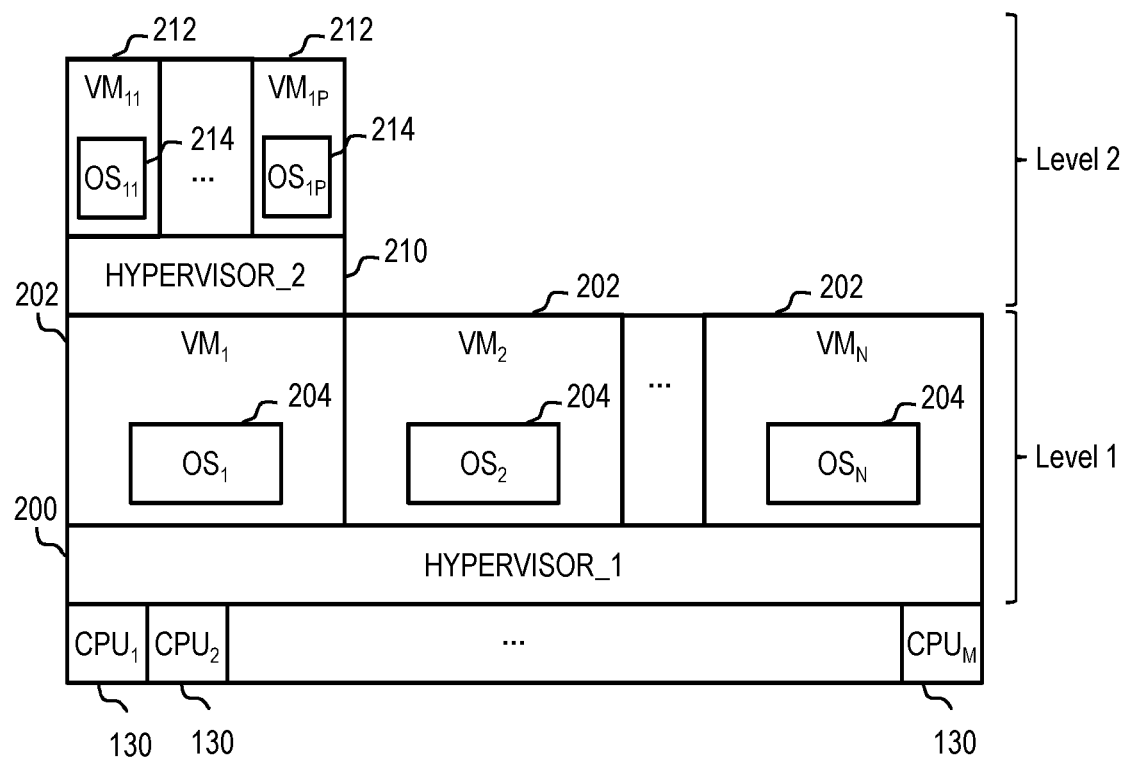
FIG. 2 depicts one example of a schematic diagram of an example virtualization scheme.

FIG. 2 depicts an example virtual machine support provided by the computer system 100. The computer system 100 may include one or more virtual machines (VMs) 202, as well as at least one hypervisor 200. A virtual machine support may provide an ability to operate large numbers of virtual machines, each capable of executing a guest operating system 204, such as z/Linux. Each virtual machine 202 may be capable of functioning as a separate system. Thus, each virtual machine may be independently reset, execute a guest operating system, and run different programs, like application programs. An operating system or application program running in a virtual machine appears to have access to the full and complete computer system. However, in reality only a portion of the available resources of the computer system may be available for usage by the respective operating system or application program.

The virtual machines may use a V=V model, in which the memory assigned to a virtual machine is backed by virtual memory, instead of real memory. Thus, each virtual machine has a virtual linear memory space. The physical resources are owned by hypervisor 200, such as a VM hypervisor, and the shared physical resources are dispatched by the hypervisor to the guest operating systems, as needed, to meet their processing demands. The V=V virtual machine model assumes that the interactions between the guest operating systems and the physical shared machine resources are controlled by the VM hypervisor, since the large number of guests may preclude the hypervisor from simply partitioning and assigning the hardware resources to the configured guest.

The processors 130 are assignable to virtual machines 202 by the hypervisor 200. A virtual machine 202 may, e.g., be assigned with one or more logical processors. Each of the logical processors may represent all or a share of the physical processors 130 that may be dynamically allocated to the virtual machine 202 by the hypervisor 200. Virtual machines 202 are managed by a hypervisor 200. The hypervisor 200 may, for example, be implemented in firmware running on the processors 130 or may be a part of an operating system executed on the computer system 100. The hypervisor 200 may, for example, be a VM hypervisor, such as z/VM® offered by International Business Machines Corporation, Armonk, N.Y.

In addition, a second level virtualization is provided with a second hypervisor 210 being executed on one of the first level guest operating systems which acts as a host operating system for the second hypervisor 210. The second hypervisor 210 may manage one or more second level virtual machines 212, each capable of executing a second level guest operating system 214.

Figure 3:
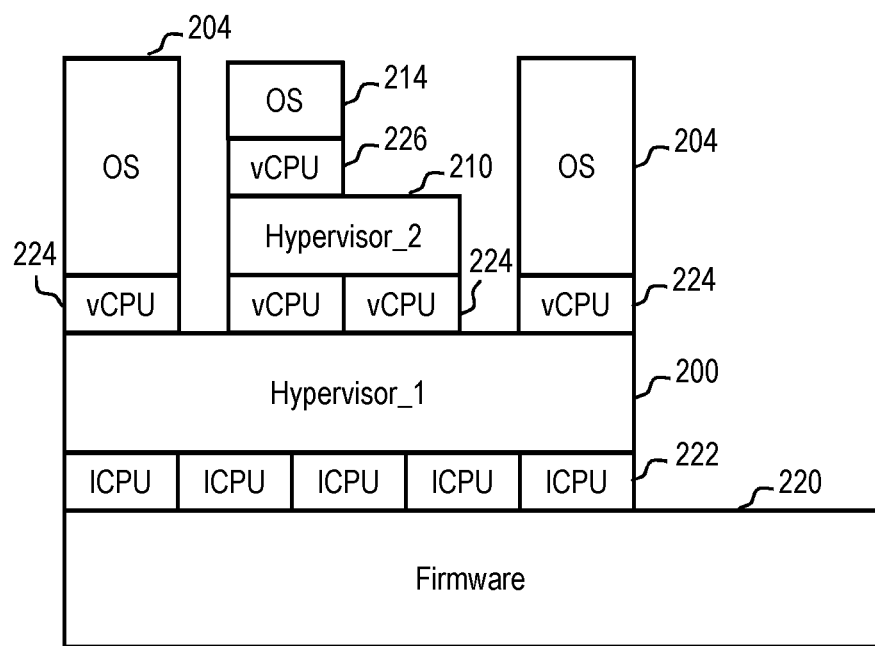
FIG. 3 depicts one example of a schematic diagram of an example virtualization scheme.

FIG. 3 depicts an example pattern illustrating the use of different types of IDs to identify processors at different hierarchical levels of the computer system 100. An underlying firmware 220 may provide logical processor IDs lCPU 222 to identify the processors 130 of the computer system 100. A first level hypervisor 200 uses the logical processor IDs lCPU 222 to communicate with the processors 130. The first level hypervisor may provide first virtual processor IDs vCPU 224 for use by guest operating systems 204 or second level hypervisors 210 executed on virtual machines managed by the first level hypervisor 200. The hypervisor 200 may group the first virtual processor IDs vCPU 224 to provide logical partitions, also referred to as zones, for the guest operating systems 204 and/or hypervisors 210. First virtual processor IDs vCPU 224 are mapped to the logical processor IDs lCPU 222 by the first level hypervisor 200. One or more of the first virtual processor IDs vCPU 224 provided by the first level hypervisor 200 may be assigned to each guest operating system 204 or hypervisor 210 executed using the first level hypervisor 200. The second level hypervisor 210 executed on the first level hypervisor 200 may provide one or more virtual machines executing software, like, e.g., further guest operating systems 214. For this purpose, the second level hypervisor manages second virtual processor IDs vCPU 226 for use by the second level guest operating system 214 executed on virtual machines of the first level hypervisor 200. The second virtual processor IDs vCPU 226 are mapped to the first virtual processor IDs vCPU 224 by the second level hypervisor 210.

A bus connected module 120 addressing processors 130 used by a first/second level guest operating system may use a target processor ID in a form of the first/second virtual processor IDs vCPU 224, 226 or alternative IDs derived from the first/second virtual processor IDs vCPU 224, 226.

Figure 4:
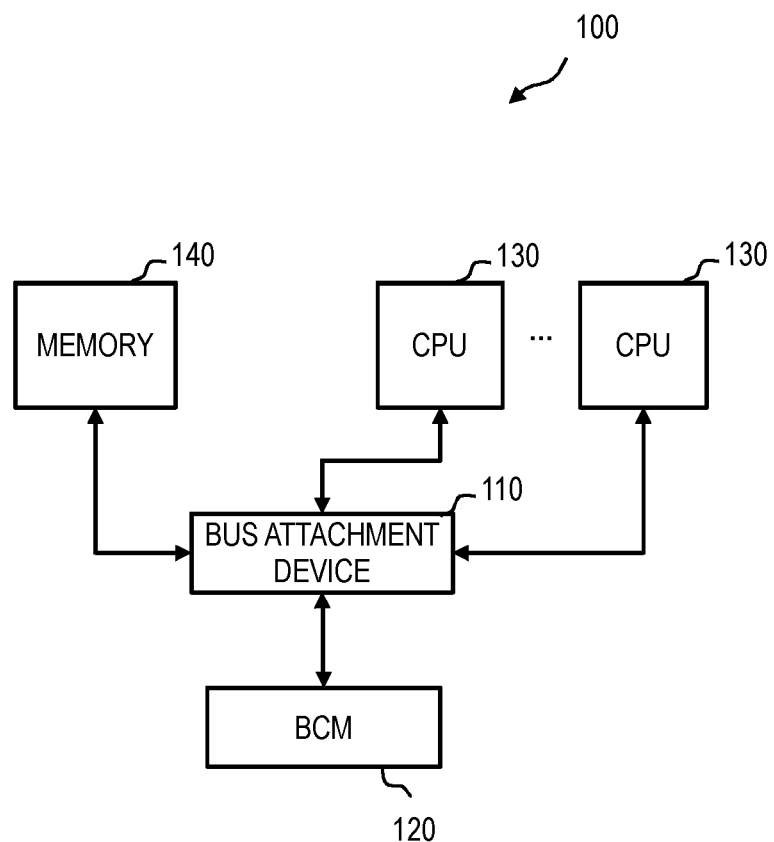
FIG. 4 depicts one example of a schematic diagram of an example computer system.

FIG. 4 depicts one example of a simplified schematic setup of the computer system 100 illustrating participants in a method of providing interrupt signals to a guest operating system executed on the computer system 100. The simplified setup for the purpose of illustration, includes, for instance, a bus connected module (BCM) 120 which sends an interrupt signal to a guest operating system executed on one or more of the processors (CPUs) 130. The interrupt signal is sent to the bus attachment device 110 with an interrupt target ID (IT_ID) identifying one of the processors 130 as a target processor. The bus attachment device 110 is an intermediate device managing the communication between the bus connected module 120 and the processors 130, as well as a memory 140 of the computer system 100. The bus attachment device 110 receives the interrupt signal and identifies using the interrupt target ID a logical processor ID of the target processor in order to address the respective target processor directly. A directed forwarding to the target processor may improve the efficiency of the data processing, e.g., by reducing cache traffic.

Figure 5:
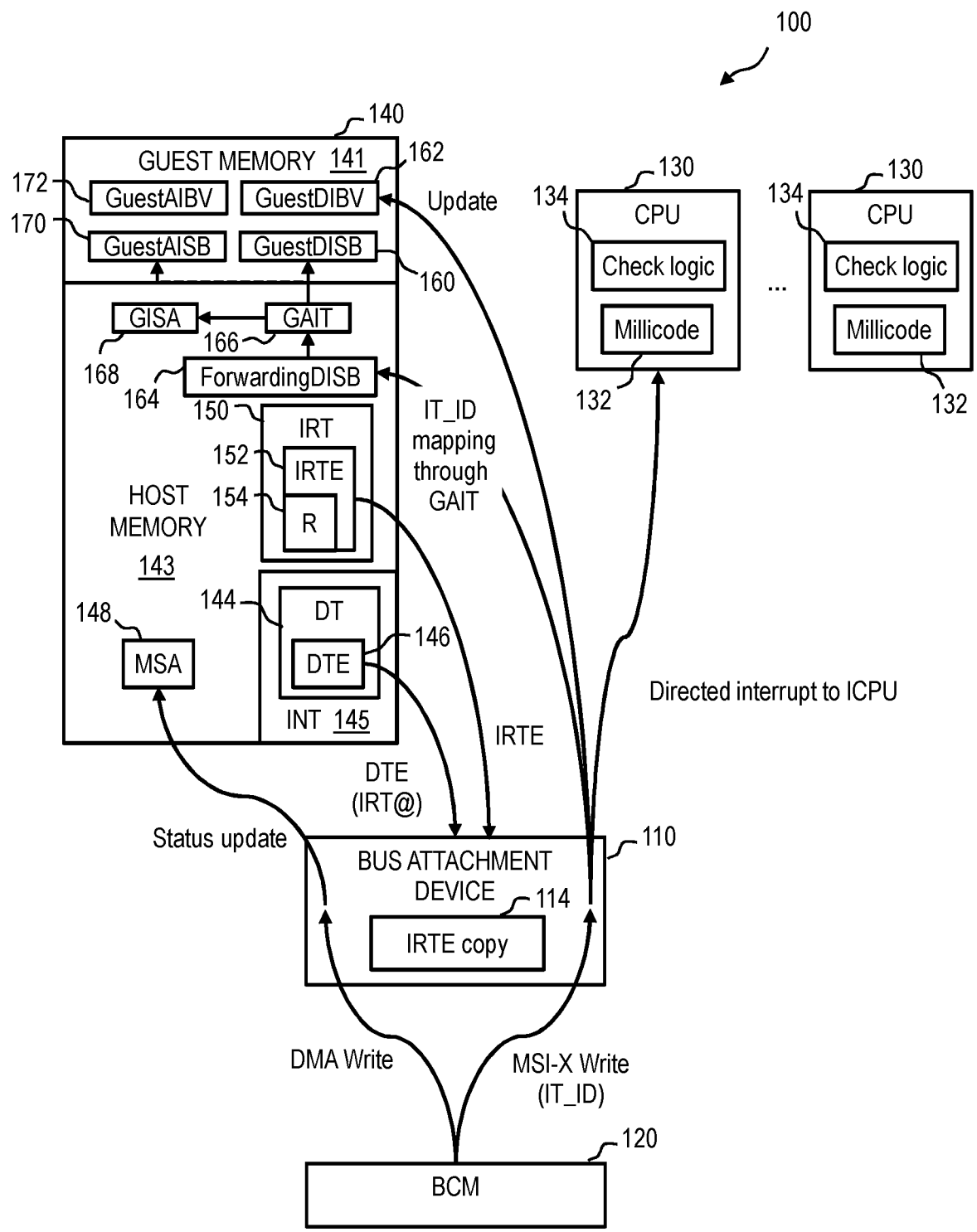
FIG. 5 depicts one example of a schematic diagram of an example computer system.

FIG. 5 depicts one example of further details of the computer system 100 of FIG. 4. As illustrated by the segmentation of memory 140, there are two levels of virtualization implemented. A first section of memory 143 is assigned to a first level guest operating system, while a second section of memory 141 is assigned to a second level guest operating system. The second level guest operating system is running on the first level guest operating system which acts as a host for the second level guest operating system. In order to address processors used by the second level guest operating, interrupt target IDs may be used which are based on at least two mappings, i.e., a first mapping of logical processor IDs by a first level hypervisor, also referred to as a native hypervisor, to first virtual processor IDs and a second mapping of the first virtual processor IDs to second virtual processor IDs by a second level hypervisor, also referred to as a hosted hypervisor hosted by the first level guest operating system running on a virtual machine managed by the first hypervisor.

The bus attachment device 110 is configured to perform status updates of a status of the bus connected module 120 in a module specific area (MSA) 148 of memory 140. Such a status update may be executed in response to receiving a direct memory access (DMA) write from the bus connected module 120 specifying the status update to be written into memory 140.

The memory furthermore includes, for instance, a device table (DT) 144 with a device table entry (DTE) 146 for each bus connected module 120 in an internal section 145 of the memory reserved for use by the hardware of computer system 100. The internal section, also referred to as a hardware system area (HSA), may comprise a fixed size and be fenced off from client purchased memory, i.e. memory assignable to a host and/or a guest operating system.

Upon receipt of an interrupt signal, e.g., an MSI-X write message with an interrupt target ID identifying a target processor for the interrupt request, the bus attachment device 110 fetches the DTE 146 assigned to the requesting bus connected module 120. For this purpose, a requestor ID identifying an origin of the interrupt request in a form of the bus connected module 120 may be received as well. The interrupt may, e.g., be targeted to the second level guest operating system, i.e. the interrupt target ID identifies a target processor assigned for use by the second level operating system. The DTE 146 may indicate whether a directed addressing of the target processor is enabled for the requesting bus connected module 120, e.g., using a direct signaling indicator (e.g., dIRQ bit). The bus attachment device 110 updates an entry of a guest directed interrupt signal vector (DIBV) 162, i.e., a DIBV assigned to the second level guest operating system and stored in a guest memory section 141 of memory 140, in order to keep track for which of the processors 130 an interrupt signal has been received from which bus connected module. Each guest DIBV 162 is assigned to one of the interrupt target IDs, i.e. processors 130, and may comprise one or more entries. Each entry is assigned to one of the bus connected modules 120. Thus, the guest DIBV 162 indicates from which bus connected modules there are interrupt signals for a specific processor 130 to be handled. This may have the advantage in order to check whether there is an interrupt signal or from which bus connected module 120 there are interrupt signals for a specific processer to be handled. Only a signal entry, e.g., bit, or only a signal vector, e.g. bit vector, has to be read from the memory 140.

Further, the bus attachment device 110 may update a forwarding vector, also referred to as a forwarding directed interrupt summary vector (DISB) 164, in order to keep track for which of the processors 130 there is an interrupt signal to be handled in case of a broadcasting. Each entry of the forwarding DISB 164 is assigned to an entry of a guest interrupt table (GAIT) 166, while the GAIT entry may comprise a memory address indicator indicating a memory address of an entry of guest DISB 160 assigned to the interrupt target ID. For example, GAIT 166 may provide an address of the guest DISB 160 (Gst_DISB@), as well as an offset (Gst_DISBO) of the respective entry within the guest DISB 160. Thus, GAIT 166 may provide a mapping of the interrupt target ID used for selecting an entry in the forwarding DISB 164 to an entry in the guest DISB 160 assigned to the respective interrupt target ID.

Besides entries which are assigned to an interrupt target ID and linked via address data provided by a GAIT entry to an entry of a guest DISB 160, the forwarding DISB 164 may further comprise entries assigned to a bus connected module, e.g., requestor ID, which are linked via address data provided by a GAIT entry to an entry of a guest AISB 170. For example, GAIT 166 may provide an address of the guest AISB 170 (Gst_AISB@), as well as an offset (Gst_AISBO) of the respective entry within the guest AISB 170. Thus, GAIT 166 may further provide a mapping of a requestor ID used for selecting an entry in the forwarding DISB 164 to an entry in the guest AISB 160 assigned to the respective requestor, i.e., bus connected module 120. In this case, the bus attachment device may update an entry of a guest interrupt signal vector (AIBV) 172 assigned to the bus connected module. Each entry of the AIBV 172 assigned to the bus connected module 120 may further be assigned to a processor 130. Thus, the AIBV itself may identify a bus connected module 120, while the entries identify processors 130.

The bus attachment device 110 uses, for instance, an entry (IRTE) 152 of an interrupt table (IRT) 150 stored in memory 140 to translate the interrupt target ID (IT_ID) to a logical processor ID (lCPU) and to forward the received interrupt signal to the target processor using the logical processor ID to address the target processor directly. For the translation, the bus attachment device 110 fetches a copy 114 of an entry (IRTE) 152. The copy may either be fetched from a local cache or from memory 140 using an address of the interrupt table 150 (IRT@) provided by the copy of the DTE 146. The IRTE 152 provides a mapping of the interrupt target ID to a logical processor ID which is used by the bus attachment device 110 to address the target processor directly in case of a directed interrupt forwarding.

The IRT 150 is stored in the first section 143 of memory 140 assigned to the first level guest operating system. This may be advantageous, since the first section may be significantly larger than the internal section 145. HSA 145 may comprise a restricted size causing problems, when the size of the IRT due to a large number of processors increases too much. This problem may be solved by storing the IRT 150 in the first section 143. However, storing the IRT 150 may require a security mechanism to ensure that the IRT is not tampered with by the first level guest operating system. This may, e.g., be achieved by comparing a logical partition ID and GISA 168 address provided by the IRTE with a logical partition ID and GISA address provided by the DTE. In case of a match the IRTE is accepted as correct, else it is rejected.

The IRTE 152 in addition provides a running indicator 154 indicating whether the target processor identified by the interrupt target ID is scheduled, i.e. running, at all. In case the target processor is not scheduled, a broadcast may be initiated in order enable a timely interrupt handling.

Each processor includes, for instance, firmware, e.g. millicode 132, to receive and process direct interrupt signals. Firmware may further comprise, e.g., microcode and/or macrocode of the processors 130. It may comprise hardware-level instructions and/or data structures used in implementation of higher-level machine code. According to embodiments, it may comprise proprietary code that may be delivered as microcode that includes trusted software or microcode specific to the underlying hardware and controls operating system access to the system hardware. Furthermore, the firmware of the processors 130 may comprise a check logic 134 to check whether the receiving processor is identical with the target processor according to the interrupt target ID which is forwarded by the bus attachment device 110 to the receiving processor 130. In case the receiving processor 130 is not the target processor, i.e., in case of a mismatch of the received interrupt target ID and a reference interrupt target ID of the receiving processor 130, the interrupt signal is broadcasted to the logical partition in order to find a processor for handling the interrupt signal.

Figure 6:
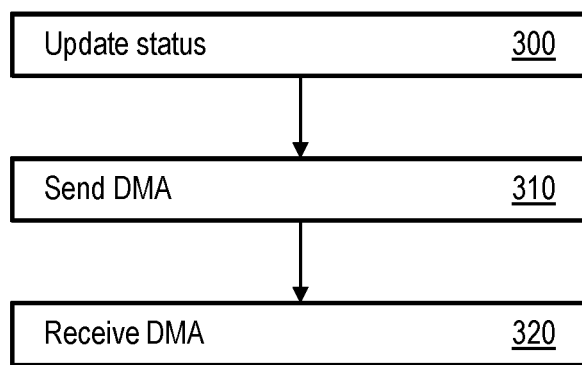
FIG. 6 depicts one example of a schematic flow diagram of an example method.

FIG. 6 is one example of a flowchart of an example method of performing a status update of a bus connected module 120 via the bus attachment device 110 using a DMA write request. In step 300, a bus connected module may decide to update its status and trigger an interrupt, e.g., in order to indicate a signal completion. In step 310, the bus connected module initiates a direct memory access (DMA) write via the bus attachment device to a section of the memory assigned to a host running on the computer system, i.e. host memory, in order to update the status of the bus connected module. A DMA is the hardware mechanism that allows peripheral components of a computer system to transfer their I/O data directly to and from main memory without a need to involve system processors. In order to perform a DMA, the bus connected module sends a DMA write request, e.g., in a form of an MSI-X message, to the bus attachment device. In case of PCIe, the bus connected module may, e.g., refer to a PCIe function provided on a PCIe adapter. In step 320, the bus connected module receives the DMA write request with the status update of the bus connected module and updates the memory using the received update. The update may be executed in an area of the host memory reserved for the respective bus connected module.

Figure 7A:
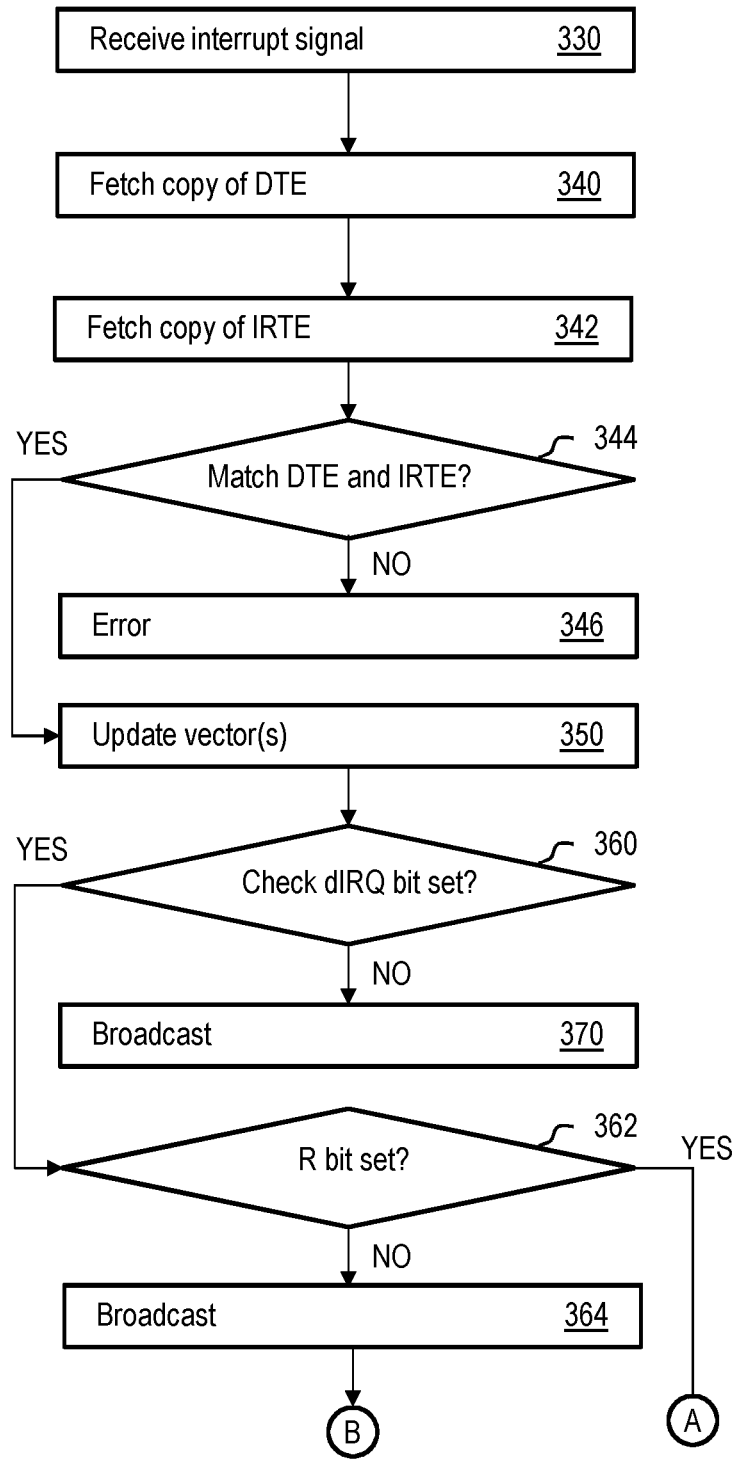
FIGS. 7A-7C depict one example of a schematic flow diagram of an example method.
Figure 7B:
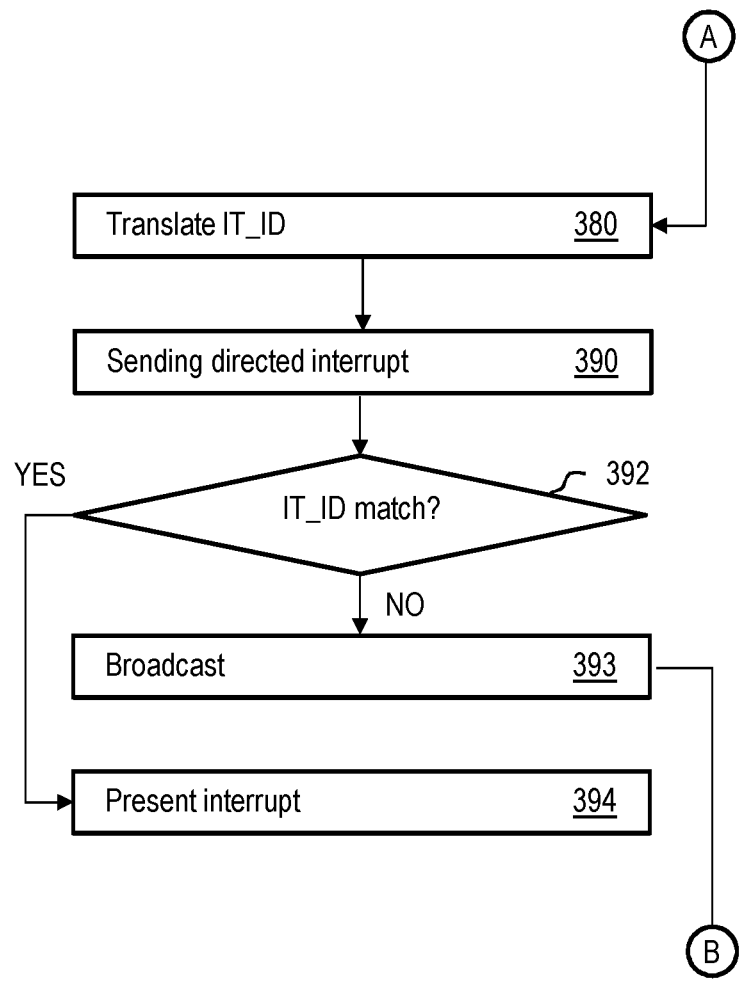
Figure 7C:
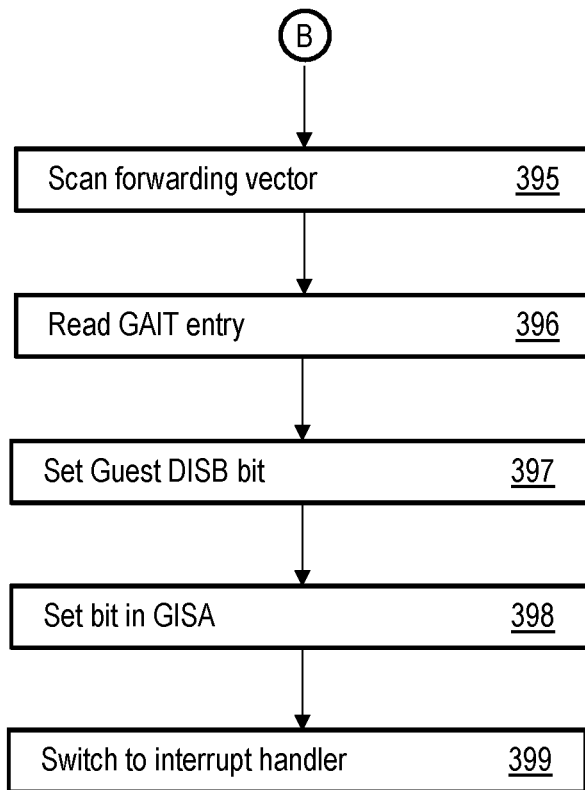

FIGS. 7A-7C depict one example of a flowchart of an example method for providing an interrupt signal to a guest operating system using the computer system 100 of FIG. 5. In step 330, the bus attachment device receives an interrupt signal, e.g., in a form of an MSI-X write message, sent by the bus connected module. This transmission of the interrupt signal may be executed according to the specifications of the PCI architecture. The MSI-X write message comprises an interrupt target ID identifying a target processor of the interrupt. The interrupt target ID may, e.g., be a virtual processor ID used by the guest operating system to identify processors of the multiprocessor computer system. According to embodiments, the interrupt target ID may be any other ID agreed upon by the guest operating system and the bus connected module in order to be able to identify processors. Such another ID may, for example, be a result of a mapping of a virtual processor ID. In addition, the MSI-X write message may further comprise an interrupt requestor ID (RID), i.e., the ID of a PCIe function issuing the interrupt request, a vector index defining an offset of a vector entry within a vector, an MSI address, e.g., 64 bit address, as well as MSI data, e.g., 32 bit data. The MSI address and MSI data may indicate that the respective write message is in fact an interrupt request in the form of an MSI message.

In step 340, the bus attachment device fetches a copy of an entry of a device table stored in the memory. The device table entry (DTE) provides address indicators of one or more vectors or vector entries to be updated in order to indicate that an interrupt signal has been received for the target processor. An address indicator for a vector entry may, e.g., comprise an address of the vector in the memory, as well as an offset within the vector. Furthermore, the DTE may provide a direct signaling indicator indicating whether the target processor is to be addressed directly by the bus attachment device using the interrupt target ID provided with the interrupt signal. Furthermore, the DTE may provide a logical partition ID, also referred to as a zone ID, and an interrupt subclass ID. The respective copy of the device table entry may be fetched from a cache or from memory.

In step 342, the bus attachment device fetches a copy of an IRTE from the memory using the interrupt target ID received with the interrupt signal, as well as an address indicator provided by the DTE indicating a memory of the IRT. In order to ensure that the IRTE has not been tampered with by the first level guest operating system, an additional check is implemented. In step 342, a copy of the IRTE is read from a memory section assigned to the first level guest operating system using the received interrupt target ID. From the fetched copy of the IRTE, the bus attachment device reads a logical processor ID assigned to the received interrupt target ID, the logical partition ID and a GISA address indicator. In step 344, the PBU compares the logical partition ID and a GISA address indicator comprised by the copy of the device table entry with the logical partition ID and a GISA address indicator provided by the copy of the IRTE to ensure that the first level guest operating system did not change either of them in the IRTE. Thus, the data provided redundantly by the device table entry is used as reference data in order to check the correctness of the data provided by the IRTE. In case of a mismatch, the IRTE is determined to be erroneous in step 346. In case the logical partition ID and a GISA address indicator provided by the copy of the IRTE are correct, the data (e.g., all data) comprised by the IRTE is assumed to be correct and the method continues with step 350. In step 350, the bus attachment device updates a vector, e.g., a guest DIBV or guest AIBV, specified in the DTE.

In step 360, the bus attachment device checks the direct signaling indicator (e.g., dIRQ bit) provided with the interrupt signal. In case the direct signaling indicator indicates no direct signaling, the bus attachment device forwards the interrupt signal in step 370 by broadcasting using the zone identifier and the interrupt subclass identifier, in order to provide the interrupt signal to a processor used by the guest operating system. In case the direct signaling indicator indicates direct signaling, the bus attachment device further checks in step 362 whether a running indicator comprised by the copy of the IRTE indicates that the target processor identified by the interrupt target ID is running.

In case the target processor is not running, the bus attachment device in step 364 sends a broadcast interrupt as a fallback using, e.g., a logical partition ID and/or an interrupt subclass ID to identify a processor suitable for handling the interrupt. In case no suitable processor matching the logical partition ID and/or the interrupt subclass ID is found, the hypervisor, i.e., a processor assigned for usage by the hypervisor, may receive the interrupt request instead of a processor assigned to the guest operating system. The hypervisor may decide on broadcasting the interrupt request again if one or more processors assigned to the guest operating system get scheduled. On an entry of a processor assigned to the operating system, the hypervisor may check for direct interrupt pending indicators, e.g., dPIA bits, to be presented to the entering processor. According to embodiments, the hypervisor may, e.g., selectively re-schedule, i.e., wake up, the target processor.

In case the target processor is running, in step 380 (FIG. 7B), the bus attachment device translates the interrupt target ID provided with the interrupt signal to a logical processor ID of a processor assigned for usage by the guest operating system. For the translation, the bus attachment device may use a mapping table comprised by the bus attachment device. The bus attachment device may comprise a mapping table or sub-table per zone, i.e., logical partition. In step 390, the bus attachment device forwards the interrupt signal to the target processor using the logical processor ID to address the respective processor directly, i.e., sending a direct message. The direct message may further comprise the zone ID and/or interrupt subclass ID. The receiving processor comprises an interrupt target ID checking logic. The checking logic may furthermore take a logical partition ID into account, in case the interrupt target ID is unique only per logical partition.

In step 392, the checking logic checks whether the received interrupt target ID and/or logical partition ID match an interrupt target ID and/or logical partition ID currently assigned to the receiving processor and accessible for the checking logic. In case of a mismatch, the receiving firmware in step 393 initiates a broadcast and broadcasts the received interrupt request to the remaining processors using the logical partition ID and/or an interrupt subclass ID to identify a valid target processor for handling the interrupt. In case of a positive match, the receiving firmware, e.g., millicode, of the target processor accepts the directly addressed interrupt for presentation to the guest operating system in step 394. In response, the firmware may interrupt its activities, e.g., program execution, and switches to execute an interrupt handler of the guest operating system. The interrupt may be presented to the guest operating system with a direct signaling indication.

In step 364 (FIG. 7A), in case the running indicator is unenabled, i.e., the target processor is not scheduled, the bus attachment device initiates a broadcast of the interrupt signal using a logical partition ID and/or an interrupt subclass ID. The broadcast using the logical partition ID is handled by the hypervisor/first level guest operating system.

Such a broadcast may as well be initiated by the receiving processor in step 393 (FIG. 7B) upon a mismatch between the received interrupt target ID and/or logical partition ID and an interrupt target ID and/or logical partition ID currently assigned to the receiving processor. The currently assigned interrupt target ID and/or logical partition ID are accessible for the checking logic as reference values for the check.

In step 395 (FIG. 7C), upon receipt of the broadcast interrupt request, a processor executing the hypervisor/first level guest operating system scans the forwarding vector. The forwarding vector is provided in a memory section assigned to the first level guest operating system. This scan may be executed by firmware, e.g., millicode, of the respective processor. Each entry, e.g. bit, of the forwarding vector corresponds to an entry in a guest interrupt table (GAIT) provided in the memory section assigned to the first level guest operating system. The corresponding entry of the GAIT may, for example, specify a forwarding of the interrupt signal to the target processor using direct addressing or using broadcasting.

In step 396, the GAIT entry corresponding to an enabled entry of the forwarding vector is read. The GAIT entry specifies an entry of a directed interrupt summary vector of the second level guest operating system. The GAIT entry provides, for example, an address indicator indicating an address of the directed interrupt summary vector in a memory section assigned to the second level guest operating system. The indicator may, for example, comprise a memory address of the directed interrupt summary vector, as well as an offset within the directed interrupt summary vector. The offset may specify a specific entry of the directed interrupt summary vector.

In step 397, the firmware enables the entry of the directed interrupt summary vector of the second level guest operating system specified in the GAIT. For example, a bit of the guest DISB may be set. The respective entry of the directed interrupt summary vector of the second level guest operating system references an interrupt target ID of a processor used by the second level guest operating system to which the interrupt signal is addressed.

In step 398, the firmware enables an entry in a guest interrupt state area (GISA), e.g. sets a bit in the GISA, of the respective second level guest operating system to make the floating interrupt request for the second level operating system pending. The GISA is assigned to the second level guest operating system and stored in the memory section assigned to the first level guest operating system. In case of a plurality of second level guest operating systems, a GISA is provided for each of the second level guest operating systems. For addressing the GISA, a GISA memory address and/or guest interrupt subclass ID (GISC) may be used. The GISA memory address and GISC may be provided by the GAIT entry read in step 396.

In step 399, when the second level guest operating system is dispatched on one of the CPUs, the firmware interrupts the program execution and switches execution to the second level guest operating system interrupt handler in order to handle the interrupt pending for the second level operating system.

Figure 8:
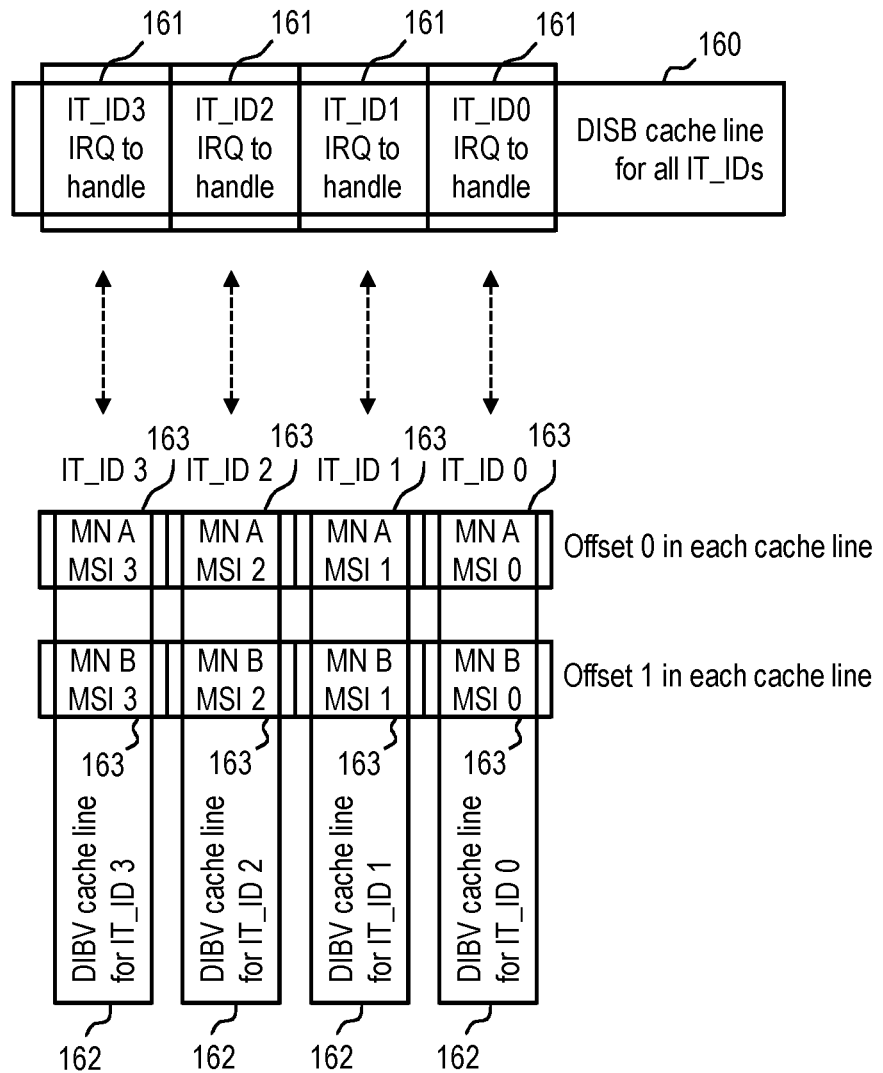
FIG. 8 depicts one example of a schematic diagram of example vector structures.

FIG. 8 depicts one example of a schematic structure of a guest DISB 160 and a plurality of guest DIBVs 162. The guest DISB 160 may be provided in a form of a contiguous section of memory, e.g., a cache line, comprising an entry 161, e.g., bit, per interrupt target ID. Each entry indicates whether there is an interrupt request (IRQ) to be handled by the respective processor identified by the interrupt target ID. For each interrupt target ID, i.e., entry of the guest DISB 160, a guest DIBV 162 is provided. Each guest DIBV 162 is assigned to a specific interrupt target ID and comprises one or more entries 163 per bus connected module MN A, MN B. The guest DIBVs 162 may each be provided in a form of a contiguous section of memory, e.g., a cache line, comprising the entries 163 assigned to the same interrupt target ID. Entries of different bus connected modules may be ordered using different offset guest DIBVOs per bus connected module.

Figure 9:
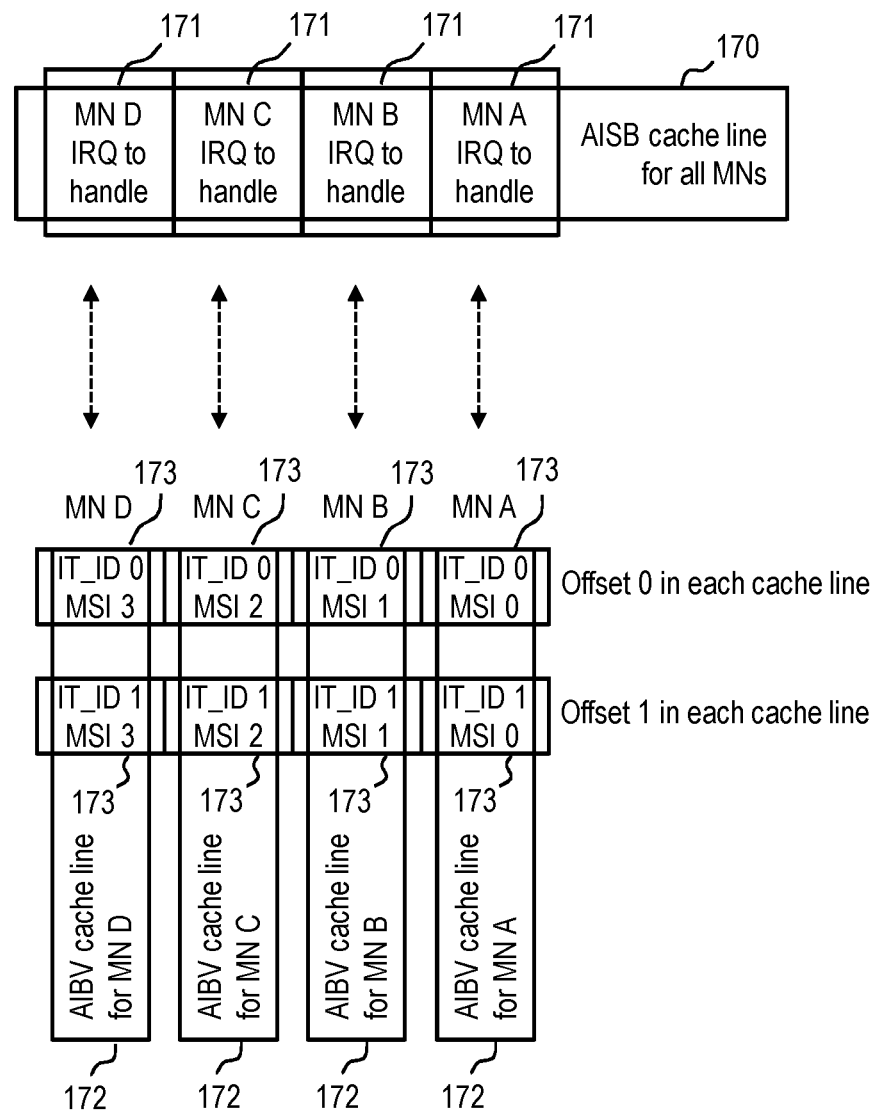
FIG. 9 depicts one example of a schematic diagram of example vector structures.

FIG. 9 depicts one example of a schematic structure of a guest AISB 170 and a plurality of guest AIBVs 172. The guest AISB 170 may be provided in a form of a contiguous section of memory, e.g., a cache line, comprising an entry 171, e.g. bit, per bus connected module MN A to MN D. Each entry indicates whether there is an interrupt request (IRQ) to be handled from the respective bus connected module. For each bus connected module, i.e., entry of the AISB 170, a guest AIBV 172 is provided. Each guest AIBV 172 is assigned to a specific bus connected module and comprises one or more entries 173 per interrupt target ID. The guest AIBVs 172 may each be provided in a form of a contiguous section of memory, e.g., a cache line, comprising the entries 173 assigned to the same bus connected module. Entries regarding different target processor IDs may be ordered using different offset guest AIBVOs per bus connected module.

Figure 10A:
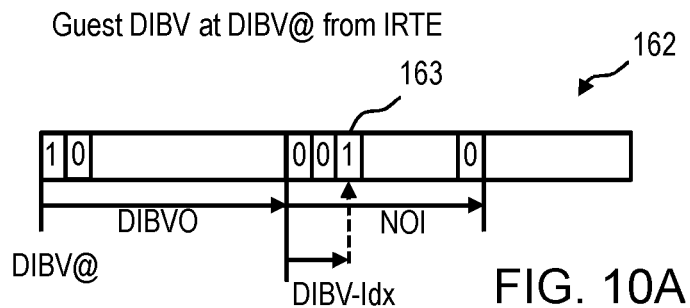
FIGS. 10A-10B depict examples of schematic diagrams of example vector structures.

FIG. 10A shows an example guest DIBV 162. The memory address of entries 163 of guest DIBV 162 are a combination of a DIBV address DIBV@ provided by the IRTE assigned to the interrupt target ID, e.g., vCPU, an offset DIBVO provided by the DTE and a DIBV index DIBV-Idx provided with the interrupt signal. Thus, each guest DIBV 162 is assigned to an interrupt target ID, while the entries are assigned to bus connected modules.

Figure 10B:
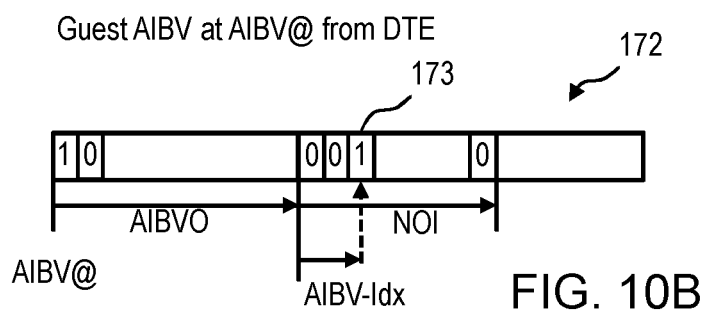

FIG. 10B shows an example guest AIBV 172. The memory address of entries 173 of guest AIBV 172 are a combination of an AIBV address AIBV@ provided by the DTE assigned to the bus connected module, an offset AIBVO provided by the DTE and an AIBV index AIBV-Idx, e.g., a MSI index, provided with the interrupt signal. Thus, each guest AIBV 172 is assigned to a bus connected module, while the entries are assigned to interrupt target IDs.

Figure 11A:
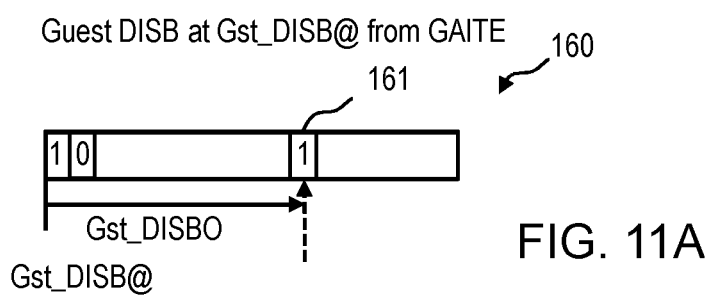
FIGS. 11A-11B depict examples of schematic diagrams of example vector structures.

FIG. 11A shows an example guest DISB 160. The memory address of entries 161 of the guest DISB 160 are provided by a host DISB address Host_DISB@ and host DISB offset Host_DISBO, both provided by the IRTE assigned to the interrupt target ID, e.g., vCPU, identifying a memory address of a forwarding DISB array in host memory. The respective entry of the forwarding DISB array identifies a GAIT entry identifying the address of the guest DISB 160 Gst_DISB@ and an offset Gst_DISBO. The respective entry is assigned to an interrupt target ID.

Figure 11B:
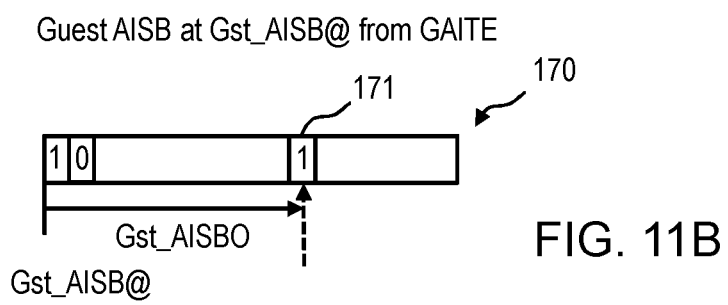

FIG. 11B shows an example guest AISB 170. The memory address of entries 171 of the guest AISB 170 are provided by a host DISB address Host_DISB@ and host DISB offset Host_DISBO, both provided by the DTE assigned to the bus connected module, identifying a memory address of a forwarding DISB array in host memory. The respective entry of the forwarding DISB array identifies a GAIT entry identifying the address of the guest AISB 170 Gst_AISB@ and an offset Gst_AISBO. The respective entry is assigned to a bus connected module.

Figure 12A:
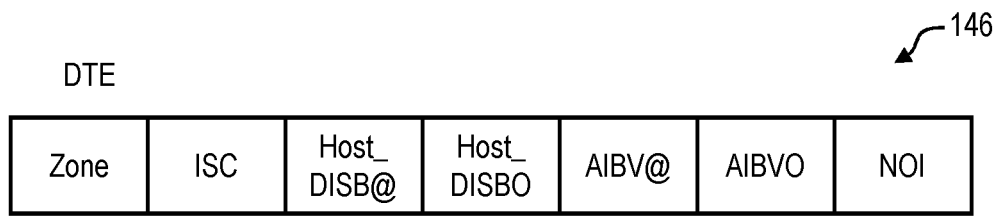
FIGS. 12A-12D depict examples of schematic diagrams of example data structures.
Figure 12B:
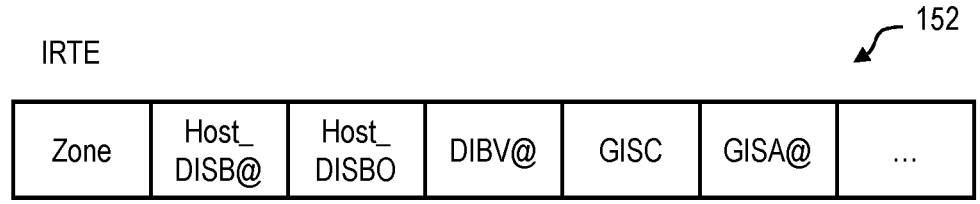
Figure 12C:
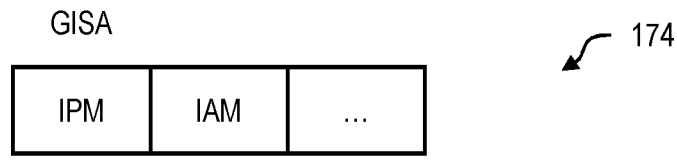
Figure 12D:
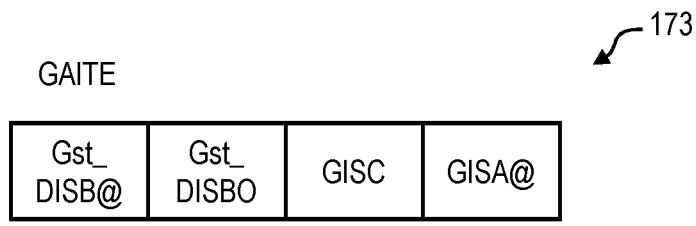

FIG. 12A depicts an example DTE 146 comprising, for example, a logical partition ID (zone), an interrupt subclass ISC, a Host_DISB@, a Host_DISBO, an AIBV@, an AIBVO and a number of interrupts (NOI) defining a maximum number of bits in the DIBV reserved for the respective bus connected module. Furthermore, an example IRTE 152 is depicted in FIG. 12B. The IRTE 152 may comprise a logical partition ID (zone), a Host_DISB@, a Host_DISBO, a DIBV@, a GISC, and an address of a guest interrupt state area (GISA) GISA@. The GISA 174, depicted in FIG. 12C, may comprise an IPM (interruption pending mask), which makes a second level guest operating system interrupt pending, and an IAM (interruption alert mask). If no vCPU of the second level guest operating system is dispatched, the IAM bit is set putting the GISA onto an Alert-List and generating a first level guest operating system interrupt. If a vCPU of the second level guest operating system is dispatched, it gets a second level guest operating system interrupt directly detected by a Cache-Line-Monitor (CLM). Finally, an example GAIT entry, GAITE 173, depicted in FIG. 12D, may comprise a Gst_DISB@, a Gst_DISBO, a GISC and a GISA@. In case the GAIT identifies a guest AISB entry instead of a guest DISB entry, it may comprise a Gst_AISB@ and a Gst_AISBO.

Figure 13:
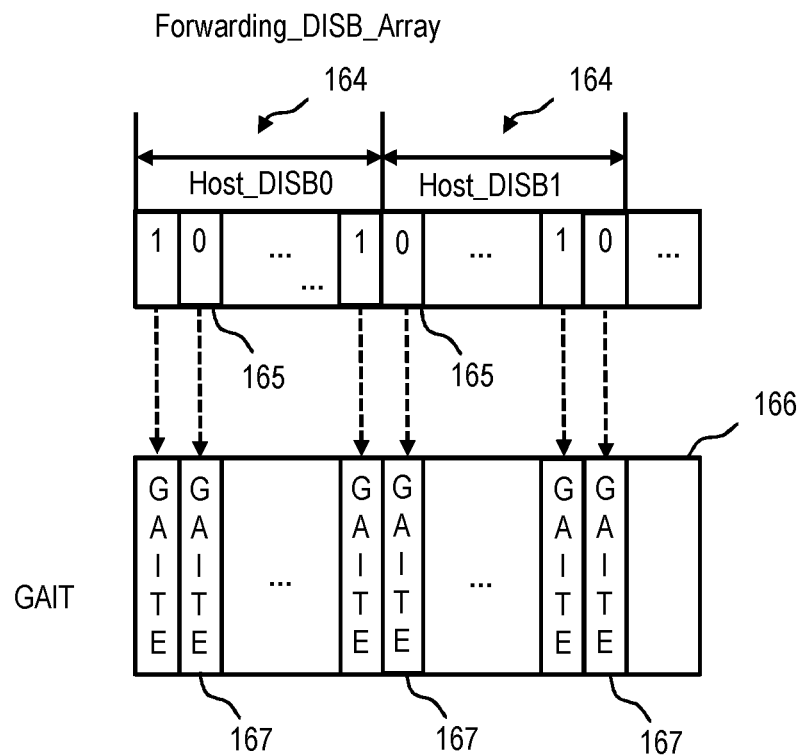
FIG. 13 depicts one example of a schematic diagram of example vector structures.

FIG. 13 depicts one example of a forwarding DISB array comprising forwarding DISB vectors 164 with entries 165. Each entry 165 is assigned to a GAITE 167 of a GAIT 166.

Various embodiments of aspects of the invention provide a method of providing an interrupt signal to a guest operating system executed using one or more processors of a plurality of processors of a computer system assigned for usage by the guest operating system, as well as a computer system and a computer program product as described by the subject matter of the independent claims. Embodiments are described in the dependent claims. Embodiments of the present invention can be freely combined with each other if they are not mutually exclusive.

One aspect of the invention relates to a method of providing an interrupt signal to a first guest operating system executed using one or more processors of a plurality of processors of a computer system assigned for usage by the first guest operating system. The computer system further comprises one or more bus connected modules being operationally connected with the plurality of processors via a bus and a bus attachment device. The computer system further comprises a memory operationally connected with the bus attachment device. Each processor of the plurality of processors is assigned with a logical processor ID used by the bus attachment device to address the respective processor, and each processor of the plurality of processors assigned for usage by the first guest operating system is further assigned with an interrupt target ID used by the first guest operating system and the one or more first bus connected modules to address the respective processor. The first guest operating system is implemented using a second guest operating system as a host hosting the first guest operating system. The method comprises: receiving by the bus attachment device an interrupt signal from one of the bus connected modules with an interrupt target ID, the interrupt target ID identifying one of the processors assigned for usage by the first guest operating system as a target processor for handling the interrupt signal; retrieving by the bus attachment device a first copy of an interrupt table entry assigned to the received interrupt target ID from an interrupt table stored in a first memory section of the memory assigned to the second guest operating system, the first copy of the interrupt table entry comprising a mapping of the received interrupt target ID to a logical processor ID; translating by the bus attachment device the received interrupt target ID to the logical processor ID using the first copy of the interrupt table entry; and forwarding by the bus attachment device the interrupt signal to the target processor for handling using the logical processor ID resulting from the translation to address the target processor directly.

Another aspect of the invention relates to a computer system for providing an interrupt signal to a first guest operating system executed using one or more processors of a plurality of processors of the computer system assigned for usage by the first guest operating system. The computer system further comprises one or more bus connected modules being operationally connected with the plurality of processors via a bus and a bus attachment device. The computer system further comprises a memory operationally connected with the bus attachment device. Each processor of the plurality of processors is assigned with a logical processor ID used by the bus attachment device to address the respective processor, and each processor of the plurality of processors assigned for usage by the first guest operating system to further assigned with an interrupt target ID used by the first guest operating system and the one or more first bus connected modules to address the respective processor. The first guest operating system is implemented using a second guest operating system as a host hosting the first guest operating system. The computer system is configured to perform a method comprising: receiving by the bus attachment device an interrupt signal from one of the bus connected modules with an interrupt target ID, the interrupt target ID identifying one of the processors assigned for usage by the first guest operating system as a target processor for handling the interrupt signal; retrieving by the bus attachment device a first copy of an interrupt table entry assigned to the received interrupt target ID from an interrupt table stored in a first memory section of the memory assigned to the second guest operating system, the first copy of the interrupt table entry comprising a mapping of the received interrupt target ID to a logical processor ID; translating by the bus attachment device the received interrupt target ID to the logical processor ID using the first copy of the interrupt table entry; and forwarding by the bus attachment device the interrupt signal to the target processor for handling using the logical processor ID resulting from the translation to address the target processor directly.

Another aspect of the invention relates to computer program product for providing an interrupt signal to a first guest operating system executed using one or more processors of a plurality of processors of a computer system assigned for usage by the first guest operating system. The computer system further comprises one or more bus connected modules being operationally connected with the plurality of processors via a bus and a bus attachment device. The computer system further comprises a memory operationally connected with the bus attachment device. Each processor of the plurality of processors is assigned with a logical processor ID used by the bus attachment device to address the respective processor, and each processor of the plurality of processors assigned for usage by the first guest operating system is further assigned with an interrupt target ID used by the first guest operating system and the one or more first bus connected modules to address the respective processor. The first guest operating system is implemented using a second guest operating system as a host hosting the first guest operating system. The computer program product comprises a computer readable non-transitory medium readable by a processing circuit and storing instructions for execution by the processing circuit for performing a method comprising: receiving by the bus attachment device an interrupt signal from one of the bus connected modules with an interrupt target ID, the interrupt target ID identifying one of the processors assigned for usage by the first guest operating system as a target processor for handling the interrupt signal; retrieving by the bus attachment device a first copy of an interrupt table entry assigned to the received interrupt target ID from an interrupt table stored in a first memory section of the memory assigned to the second guest operating system, the first copy of the interrupt table entry comprising a mapping of the received interrupt target ID to a logical processor ID; translating by the bus attachment device the received interrupt target ID to the logical processor ID using the first copy of the interrupt table entry; and forwarding by the bus attachment device the interrupt signal to the target processor for handling using the logical processor ID resulting from the translation to address the target processor directly.

In one or more embodiments, the guest operating system may, for example, be implemented using a pageable storage mode guest. A pageable guest, e.g., in a z/Architecture® hardware architecture, may be interpretively executed via a Start Interpretive Execution (SIE) instruction, at level 2 of interpretation. For instance, a logical partition (LPAR) hypervisor executes the SIE instruction to begin a logical partition in physical, fixed memory. An operating system in that logical partition, e.g., z/VM®, may issue the SIE instruction to execute its guests (virtual) machines in its virtual storage. Thus, the LPAR hypervisor may use level-1 SIE and the z/VM® hypervisor may use level-2 SIE.

According to embodiments, a computer system is a System z server offered by International Business Machines Corporation. System z® is based on the z/Architecture® hardware architecture offered by International Business Machines Corporation. Details regarding the z/Architecture® hardware architecture are described in an IBM publication entitled, "z/Architecture Principles of Operation," IBM Publication No. SA22-7832-11, Aug. 25, 2017, which is hereby incorporated herein by reference in its entirety. IBM, System z and z/Architecture are registered trademarks or trademarks of International Business Machines Corporation, Armonk, N.Y. in at least one jurisdiction. Other names used herein may be registered trademarks, trademarks or product names of International Business Machines Corporation or other companies.

According to embodiments, computer systems of other architectures may implement and use one or more aspects of the present invention. As examples, servers other than System z® servers, such as Power Systems servers or other servers offered by International Business Machines Corporation, or servers of other companies implement, use and/or benefit from one or more aspects of the present invention. Power is a trademark or registered trademark of International Business Machines Corporation in at least one jurisdiction. Further, although in the examples herein, the bus connected modules and the bus attachment device are considered a part of a server, in other embodiments, they do not have to necessarily be considered a part of the server, but may simply be considered as being coupled to system memory and/or other components of a computer system. The computer system need not be a server. Further, although the bus connected modules may be PCIe, one or more aspects of the present invention are usable with other bus connected modules. PCIe adapter and PCIe functions are just examples. Further, one or more aspects of the present invention may be applicable to interrupt schemes other than PCI MSI and PCI MSI-X. Yet further, although examples are described in which bits are set, in other embodiments, bytes or other types of indicators may be set. Moreover, the DTE and other structures may include more, less and/or different information.

Further, other types of computer systems may benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code is to be retrieved from bulk storage during execution.

Input/Output or I/O devices including, but not limited to, keyboards, displays, pointing devices, DASD (direct access storage device), tape, CDs (compact discs), DVDs (digital versatile discs), thumb drives and other memory media, etc., may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 14:
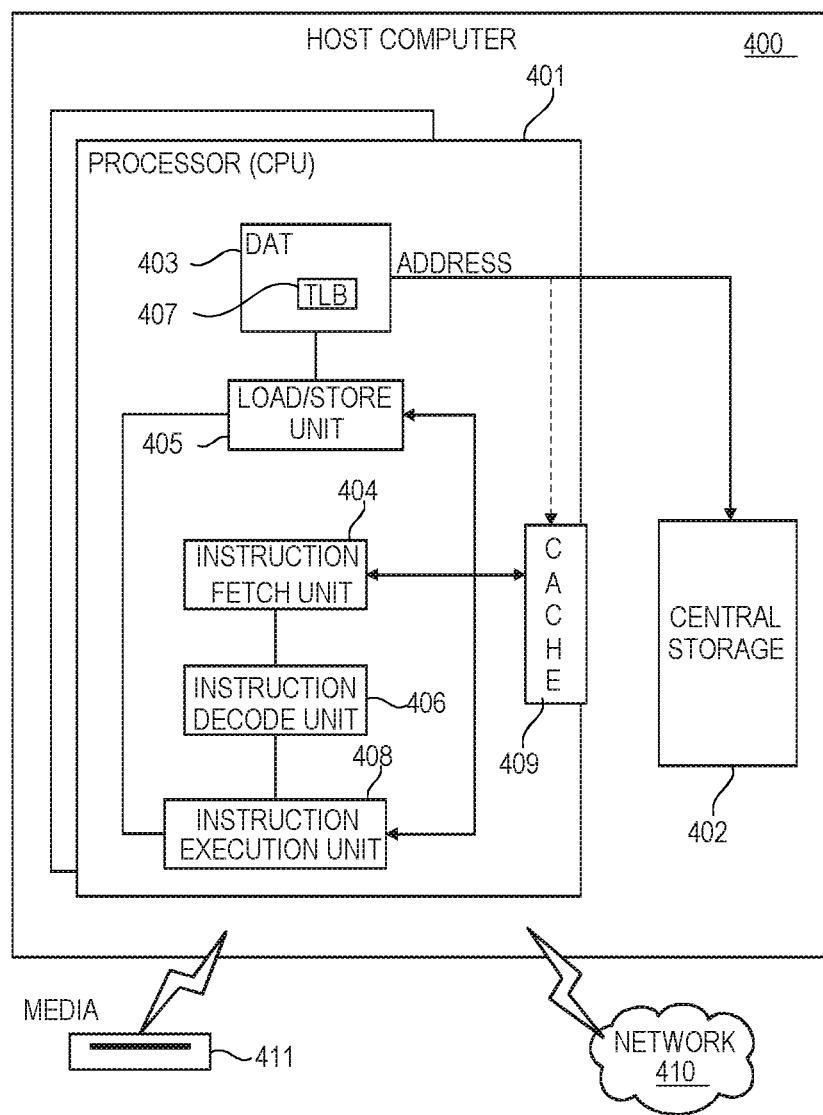
FIG. 14 depicts one example of a schematic diagram of an example computer system.

Referring to FIG. 14, representative components of a host computer system 400 to implement one or more aspects of the present invention are portrayed. The representative host computer 400 comprises one or more processors, e.g., CPUs, 401 is communication with computer memory 402, as well as I/O interfaces to storage media devices 411 and networks 410 for communicating with other computers or SANs and the like. The CPUs 401 are compliant with an architecture having an architected instruction set and architected functionality. The CPUs 401 may have dynamic address translation (DAT) 403 for transforming program addresses, virtual addresses, into real addresses of memory. A DAT may comprise a translation lookaside buffer (TLB) 407 for caching translations so that later accesses to the block of computer memory 402 do not require the delay of address translation. A cache 409 may be employed between computer memory 402 and the CPUs 401. The cache 409 may be hierarchically structured providing a large, high level cache available to more than one CPU and smaller, faster, lower level caches between the high-level cache and each CPU. In some implementations, the lower level caches may be split to provide separate low-level caches for instruction fetching and data accesses. According to embodiments, an instruction may be fetched from memory 402 by an instruction fetch unit 404 via a cache 409. The instruction may be encoded in an instruction decode unit 406 and dispatched, in some embodiments with other instructions, to instruction execution unit or units 408. Several execution units 408 may be employed, for example an arithmetic execution unit, a floating-point execution unit and a branch instruction execution unit. The instruction is executed by the execution unit, accessing operands from instruction specified registers or memory as needed. If an operand is to be accessed, e.g., loaded or stored, from memory 402, a load/store unit 405 may handle the access under control of the instruction being executed. Instructions may be executed in hardware circuits or in internal microcode, i.e., firmware, or by a combination of both.

A computer system may comprise information in local or main storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage, e.g., from input devices, before they may be processed.

Main storage may include one or more smaller, faster-access buffer storages, sometimes called caches. A cache may be physically associated with a CPU or an I/O processor. The effects, except on performance, of the physical construction and use of distinct storage media may generally not be observable by programs executed.

Separate caches may be maintained for instructions and for data operands. Information within a cache may be maintained in contiguous bytes on an integral boundary called a cache block or cache line. A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage may be viewed as a long horizontal string of bits. For most operations, accesses to storage may proceed in a left-to-right sequence. The string of bits is subdivided into units of eight bits. An eight-bit unit is called a byte, which is the basic building block of all information formats. Each byte location in storage may be identified by a unique nonnegative integer, which is the address of that byte location, also referred to as the byte address. Adjacent byte locations may have consecutive addresses, starting with 0 on the left and proceeding in a left-to-right sequence. Addresses are unsigned binary integers and may e.g. be 24, 31, or 64 bits.

Information is transmitted between memory and CPUs one byte, or a group of bytes, at a time. Unless otherwise specified, in, for instance, the z/Architecture® hardware architecture, a group of bytes in memory is addressed by the leftmost byte of the group. The number of bytes in the group is either implied or explicitly specified by the operation to be performed. When used in a CPU operation, a group of bytes is called a field. Within each group of bytes, in, for instance, the z/Architecture® hardware architecture, bits are numbered in a left-to-right sequence. In the z/Architecture® hardware architecture, the leftmost bits are sometimes referred to as the "high-order" bits and the rightmost bits as the "low-order" bits. Bit numbers are not storage addresses, however. Only bytes may be addressable. To operate on individual bits of a byte in storage, the entire byte may be accessed. The bits in a byte may be numbered 0 through 7, from left to right in, e.g., the z/Architecture hardware architecture. The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format may be consecutively numbered starting from 0. For purposes of error detection, and in, e.g., for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which may be one, two, four, eight, or sixteen bytes. Larger fields may be implied for some instructions. When the length of a storage-operand field is not implied but is stated explicitly, the field is said to have a variable length. Variable-length operands may vary in length by increments of one byte or with some instructions, in multiples of two bytes or other multiples. When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, aspects of the invention may be practiced by software, sometimes referred to licensed internal code, firmware, micro-code, milli-code, pico-code and the like, any of which would be consistent with aspects of the present invention. Referring to FIG. 14, software program code which embodies aspects of the present invention may be accessed from long-term storage media devices 411, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 402 or storage of one computer system over a network 410 to other computer systems for use by users of such other systems.

Software program code may comprise an operating system which controls the function and interaction of the various computer components and one or more application programs. Program code may be paged from storage media device 411 to the relatively higher-speed computer storage 402 where it is available for processing by processor 401.

Well known techniques and methods for embodying software program code in memory, on physical media, and/or distributing software code via networks may be used. Program code, when created and stored on a tangible medium, including but not limited to electronic memory modules (RAM), flash memory, Compact Discs (CDs), DVDs, Magnetic Tape, may be referred to as a "computer program product". The computer program product medium may be readable by a processing circuit in, e.g., a computer system for execution by the processing circuit.

Figure 15:
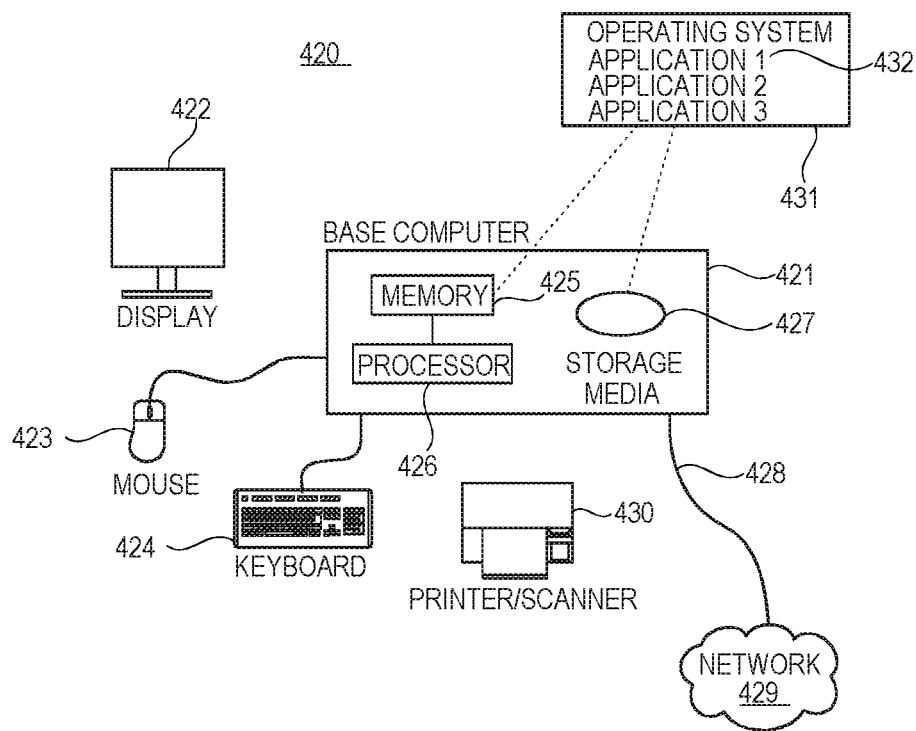
FIG. 15 depicts one example of a schematic diagram of an example computer system.

FIG. 15 illustrates a representative workstation or server hardware system in which embodiments of aspects of the present invention may be implemented. The system 420 of FIG. 15 comprises, e.g., a representative base computer system 421, such as a personal computer, a workstation or a server, including optional peripheral devices. The base computer system 421 includes one or more processors 426 and a bus employed to connect and enable communication between the processor(s) 426 and the other components of the system 421 in accordance with known techniques. The bus connects the processor 426 to memory 425 and long-term storage 427 which may include a hard drive, including any of magnetic media, CD, DVD and Flash Memory for example, or a tape drive for example. The system 421 might also include a user interface adapter, which connects the microprocessor 426 via the bus to one or more interface devices, such as a keyboard 424, a mouse 423, a printer/scanner 430 and/or other interface devices, which may be any user interface device, such as a touch sensitive screen, digitized entry pad, etc. The bus also connects a display device 422, such as an LCD screen or monitor, to the microprocessor 426 via a display adapter.

The system 421 may communicate with other computers or networks of computers by way of a network adapter capable of communicating 428 with a network 429. Example network adapters are communications channels, token ring, Ethernet or modems. Alternatively, the system 421 may communicate using a wireless interface, such as a cellular digital packet data (CDPD) card. The system 421 may be associated with such other computers in a Local Area Network (LAN) or a Wide Area Network (WAN), or the system 421 may be a client in a client/server arrangement with another computer, etc.

Figure 16:
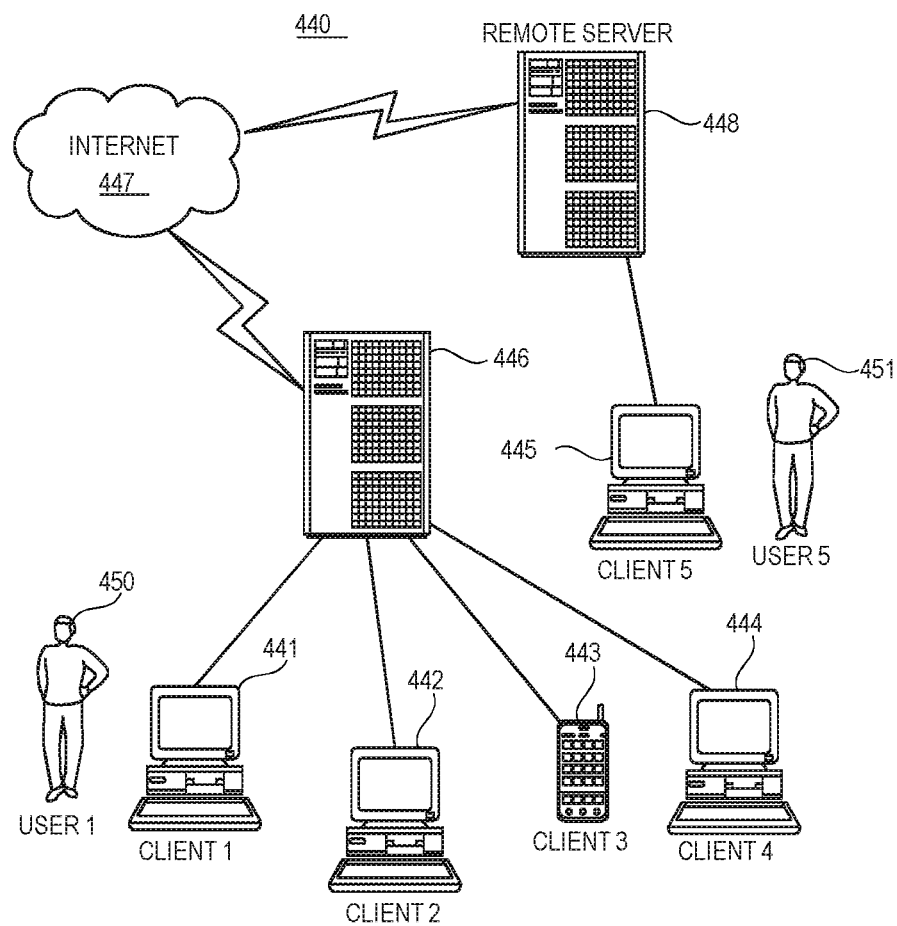
FIG. 16 depicts one example of a schematic diagram of an example computer system.

FIG. 16 illustrates a data processing network 440 in which embodiments of the present invention may be implemented. The data processing network 440 may include a plurality of individual networks, such as a wireless network and a wired network, each of which may include a plurality of individual workstations 441, 442, 443, 444. Additionally, as those skilled in the art will appreciate, one or more LANs may be included, where a LAN may comprise a plurality of intelligent workstations coupled to a host processor.

Still referring to FIG. 16, the networks may also include mainframe computers or servers, such as a gateway computer, e.g., client server 446, or application server, e.g., remote server 448 which may access a data repository and may also be accessed directly from a workstation 445. A gateway computer 446 may serve as a point of entry into each individual network. A gateway may be needed when connecting one networking protocol to another. The gateway 446 may be, e.g., coupled to another network, like the Internet 447 for example, by means of a communications link. The gateway 446 may also be directly coupled to one or more workstations 441, 442, 443, 444 using a communications link. The gateway computer may be implemented utilizing an IBM eServer™ System z® server available from International Business Machines Corporation.

Referring concurrently to FIG. 15 and FIG. 16, software programming code which may embody aspects of the present invention may be accessed by the processor 426 of the system 420 from long-term storage media 427, such as a CD-ROM drive or hard drive. The software programming code may be embodied on any of a variety of known media for use with a data processing system, such as a diskette, hard drive, or CD-ROM. The code may be distributed on such media, or may be distributed to users 450, 451 from the memory or storage of one computer system over a network to other computer systems for use by users of such other systems.

Alternatively, the programming code may be embodied in the memory 425, and accessed by the processor 426 using the processor bus. Such programming code may include an operating system 431 which controls the function and interaction of the various computer components and one or more application programs 432. Program code may be paged from storage media 427 to high-speed memory 425, where it is available for processing by the processor 426. Well known techniques and methods for embodying software programming code in memory, on physical media, and/or distributing software code via networks may be used.

The cache that is most readily available to a processor, i.e., which may be faster and smaller than other caches of the processor, is the lowest cache, also referred to as the L1 or level one cache, and main memory is the highest-level cache, also referred to as Ln, e.g., L3, if there are n, e.g., n=3, levels. The lowest-level cache may be divided into an instruction cache, also referred to as I-cache, holding machine readable instructions to be executed and a data cache, also referred to as D-Cache, holding data operands.

Figure 17:
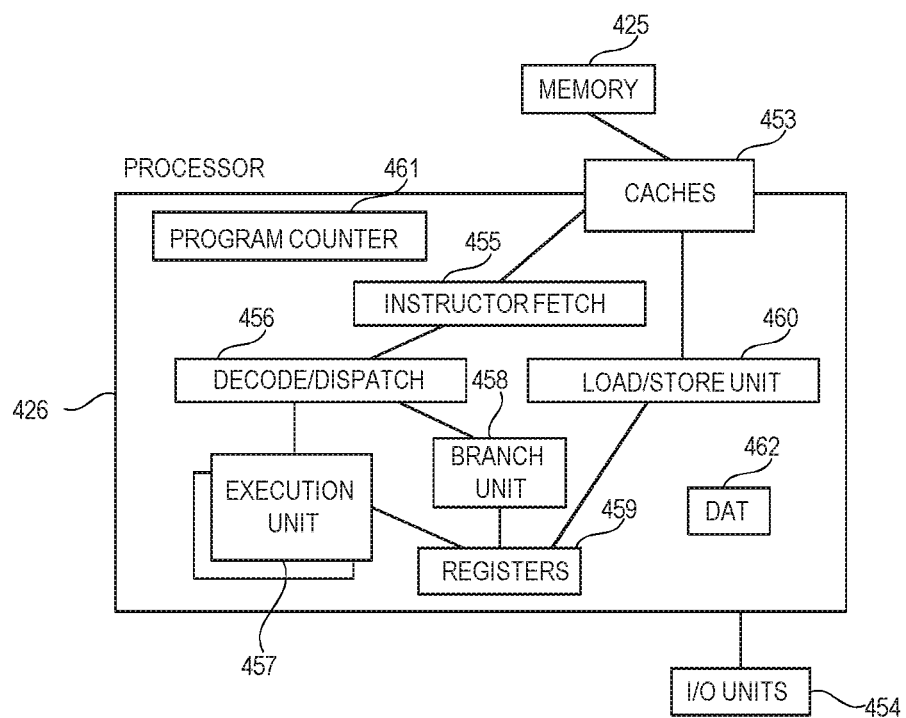
FIG. 17 depicts one example of a schematic diagram of an example computer system.

Referring to FIG. 17, an example processor embodiment is depicted for processor 426. One or more levels of cache 453 may be employed to buffer memory blocks in order to improve processor performance. The cache 453 is a high-speed buffer holding cache lines of memory data that are likely to be used. Cache lines may for example be 64, 128 or 256 bytes of memory data. Separate caches may be employed for caching instructions and for caching data. Cache coherence, i.e., synchronization of copies of lines in memory and the caches, may be provided by various suitable algorithms, e.g., "snoop" algorithms. Main memory storage 425 of a processor system may be referred to as a cache. In a processor system having 4 levels of cache 453, main storage 425 is sometimes referred to as the level 5 (L5) cache, since it may be faster and only holds a portion of the non-volatile storage that is available to a computer system. Main storage 425 "caches" pages of data paged in and out of the main storage 425 by the operating system.

A program counter (instruction counter) 461 keeps track of the address of the current instruction to be executed. A program counter in a z/Architecture® processor is 64 bits and may be truncated to 31 or 24 bits to support prior addressing limits. A program counter may be embodied in a program status word (PSW) of a computer such that it persists during context switching. Thus, a program in progress, having a program counter value, may be interrupted by, for example, the operating system resulting in a context switch from the program environment to the operating system environment. The PSW of the program maintains the program counter value while the program is not active, and the program counter in the PSW of the operating system is used while the operating system is executing. The program counter may be incremented by an amount equal to the number of bytes of the current instruction. Reduced Instruction Set Computing (RISC) instructions may be fixed length, while Complex Instruction Set Computing (CISC) instructions may be variable length. Instructions of the IBM z/Architecture® hardware architecture are, e.g., CISC instructions having a length of 2, 4 or 6 bytes. The Program counter 461 may be modified by either a context switch operation or a branch taken operation of a branch instruction for example. In a context switch operation, the current program counter value is saved in the program status word along with other state information about the program being executed, such as condition codes, and a new program counter value is loaded pointing to an instruction of a new program module to be executed. A branch taken operation may be performed in order to permit the program to make decisions or loop within the program by loading the result of the branch instruction into the program counter 461.

An instruction fetch unit 455 may be employed to fetch instructions on behalf of the processor 426. The fetch unit either fetches "next sequential instructions," target instructions of branch taken instructions, or first instructions of a program following a context switch. Modern instruction fetch units may employ prefetch techniques to speculatively prefetch instructions based on the likelihood that the prefetched instructions might be used. For example, a fetch unit may fetch 16 bytes of an instruction that includes the next sequential instruction and additional bytes of further sequential instructions.

The fetched instructions may then be executed by the processor 426. According to embodiments, the fetched instruction(s) may be passed to a dispatch unit 456 of the fetch unit. The dispatch unit decodes the instruction(s) and forwards information about the decoded instruction(s) to appropriate units 457, 458, 460. An execution unit 457 may receive information about decoded arithmetic instructions from the instruction fetch unit 455 and may perform arithmetic operations on operands according to the opcode of the instruction. Operands may be provided to the execution unit 457 either from memory 425, architected registers 459 or from an immediate field of the instruction being executed. Results of the execution, when stored, may be stored either in memory 425, registers 459 or in other machine hardware, such as control registers, PSW registers and the like.

Figure 18A:
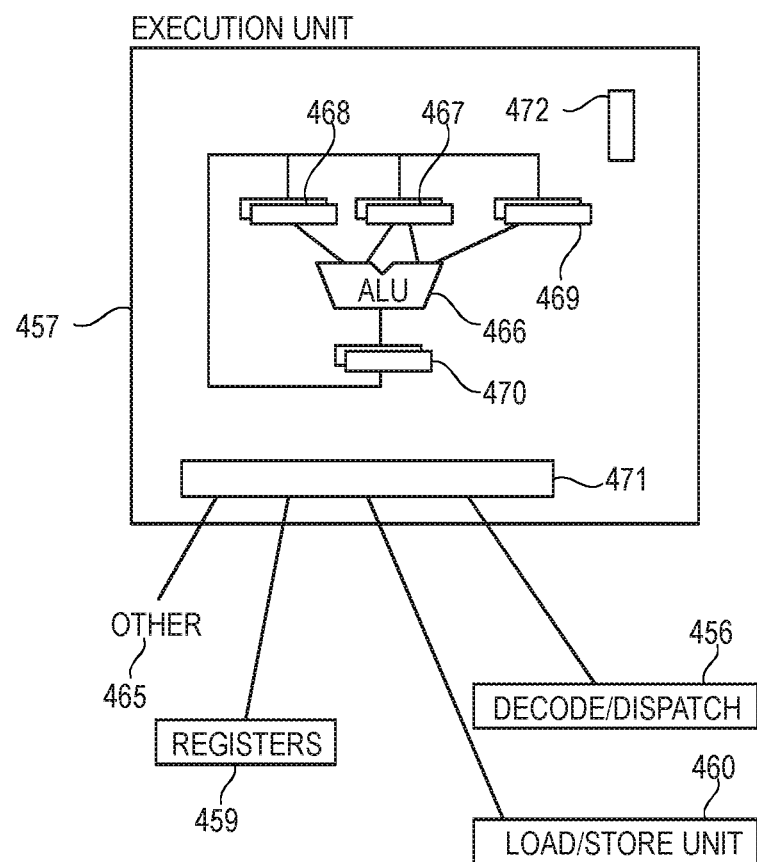
FIGS. 18A-18C depict examples of schematic diagrams of example units.

A processor 426 may have dynamic address translation (DAT) 462 for translating program addresses, e.g., virtual addresses to, e.g., real addresses, and processor 426 may comprise one or more units 457, 458, 460 for executing the function of the instruction. Referring to FIG. 18A, an execution unit 457 may communicate with architected general registers 459, a decode/dispatch unit 456, a load store unit 460, and other 465 processor units by way of interfacing logic 471. An execution unit 457 may employ several register circuits 467, 468, 469 to hold information that the arithmetic logic unit (ALU) 466 operates on. The ALU performs arithmetic operations such as add, subtract, multiply and divide, as well as logical function such as And, Or, Exclusive-or (XOR), Rotate and Shift. The ALU may support specialized operations that are design dependent. Other circuits may provide other architected facilities 472 including condition codes and recovery support logic for example. The result of an ALU operation may be held in an output register circuit 470 which is configured to forward the result to a variety of other processing functions. There are many arrangements of processor units, the present description is only intended to provide a representative understanding of one embodiment.

An ADD instruction for example may be executed in an execution unit 457 having arithmetic and logical functionality while a floating-point instruction for example would be executed in a floating-point execution having specialized floating point capability. An execution unit operates on operands identified by an instruction by performing an opcode defined function on the operands. For example, an ADD instruction may be executed by an execution unit 457 on operands found in two registers 459 identified by register fields of the instruction.

The execution unit 457 performs the arithmetic addition on two operands and stores the result in a third operand where the third operand may be a third register or one of the two source registers. The execution unit utilizes, e.g., an Arithmetic Logic Unit (ALU) 466 that is capable of performing a variety of logical functions such as Shift, Rotate, And, Or and XOR, as well as a variety of algebraic functions including any of add, subtract, multiply, divide. Some ALUs 466 are designed for scalar operations and some for floating point. Data may be big endian, where the least significant byte is at the highest byte address, or little endian, where the least significant byte is at the lowest byte address, depending on architecture. The IBM z/Architecture® hardware architecture is big endian. Signed fields may be sign and magnitude, 1's complement or 2's complement depending on architecture. A 2's complement number may be advantageous in that the ALU does not need to design a subtract capability since either a negative value or a positive value in 2's complement requires only an addition within the ALU. Numbers may be described in shorthand, where a 12-bit field defines an address of a 4,096-byte block and described as a 4 Kbyte (Kilo-byte) block, for example.

Figure 18B:
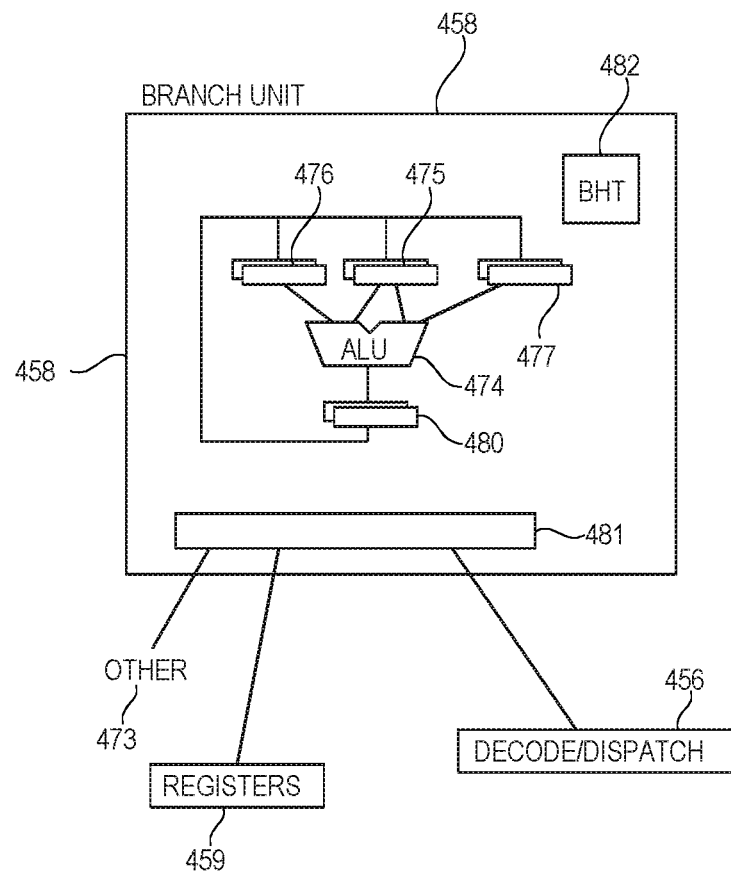

Referring to FIG. 18B, branch instruction information for executing a branch instruction may be sent to a branch unit 458 which often employs a branch prediction algorithm such as a branch history table 482 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A branch instruction may test condition codes and branch to a target address if the condition codes meet the branch requirement of the branch instruction, a target address may be calculated based on several numbers including ones found in register fields or an immediate field of the instruction for example. The branch unit 458 may employ an ALU 474 having a plurality of input register circuits 475, 476, 477 and an output register circuit 480. The branch unit 458 may communicate with general registers 459, decode dispatch unit 456 or other circuits 473, for example.

The execution of a group of instructions may be interrupted for a variety of reasons including a context switch initiated by an operating system, a program exception or error causing a context switch, an I/O interrupt signal causing a context switch or a multi-threading activity of a plurality of programs in a multi-threaded environment, for example. A context switch action saves state information about a currently executing program and then loads state information about another program being invoked. State information may be saved in hardware registers or in memory, for example. State information comprises, e.g., a program counter value pointing to a next instruction to be executed, condition codes, memory translation information and architected register content. A context switch activity may be exercised by hardware circuits, application programs, operating system programs or firmware code, like e.g. microcode, pico-code or licensed internal code (LIC), alone or in combination.

A processor accesses operands according to instruction defined methods. The instruction may provide an immediate operand using the value of a portion of the instruction, may provide one or more register fields explicitly pointing to either general purpose registers or special purpose registers, like e.g. floating-point registers, for example. The instruction may utilize implied registers identified by an opcode field as operands. The instruction may utilize memory locations for operands. A memory location of an operand may be provided by a register, an immediate field, or a combination of registers and immediate field as exemplified by the z/Architecture® hardware architecture long displacement facility wherein the instruction defines a base register, an index register and an immediate field, i.e., displacement field, that are added together to provide the address of the operand in memory for example. Location herein may imply a location in main memory unless otherwise indicated.

Figure 18C:
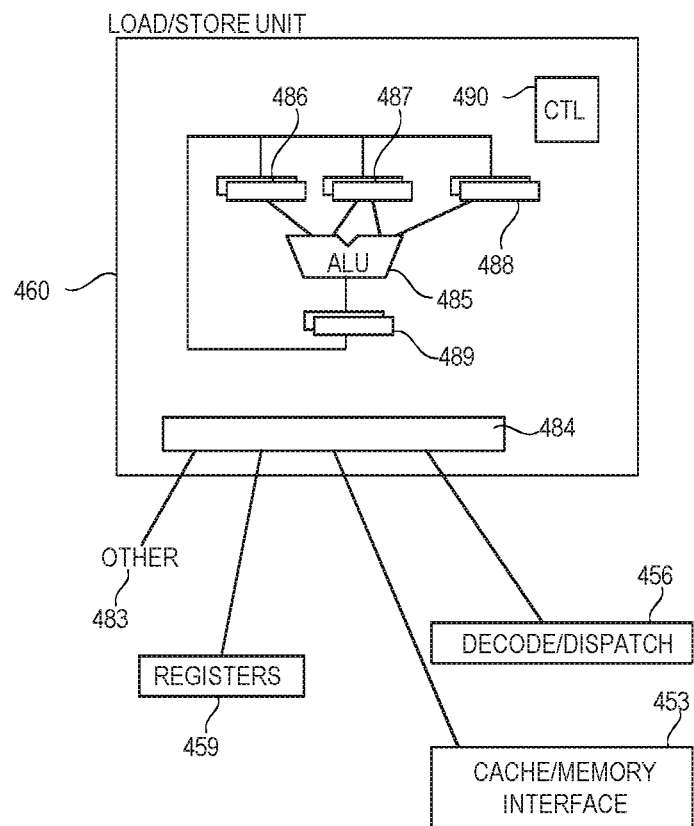

Referring to FIG. 18C, a processor accesses storage using a load/store unit 460. The load/store unit 460 may perform a load operation by obtaining the address of the target operand in memory 453 and loading the operand in a register 459 or another memory 453 location, or may perform a store operation by obtaining the address of the target operand in memory 453 and storing data obtained from a register 459 or another memory 453 location in the target operand location in memory 453. The load/store unit 460 may be speculative and may access memory in a sequence that is out-of-order relative to instruction sequence, however the load/store unit 460 is to maintain the appearance to programs that instructions were executed in order. A load/store unit 460 may communicate with general registers 459, decode/dispatch unit 456, cache/memory interface 453 or other elements 483 via, e.g., interfacing logic 884, and comprises various register circuits 486, 487, 488 and 489, ALUs 485 and control logic 490 to calculate storage addresses and to provide pipeline sequencing to keep operations in-order. Some operations may be out-of-order but the load/store unit provides functionality to make the out-of-order operations to appear to the program as having been performed in order.

Addresses that an application program "sees" are often referred to as virtual addresses. Virtual addresses are sometimes also referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables comprising at least a segment table and a page table alone or in combination, the segment table having an entry pointing to the page table. In the z/Architecture® hardware architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address may then utilize the entry of the fast TLB rather than the slow sequential translation table accesses. TLB content may be managed by a variety of replacement algorithms including Least Recently used (LRU).

Each processor of a multiprocessor system has the responsibility to keep shared resources, such as I/O, caches, TLBs and memory, interlocked for coherency. So-called "snoop" technologies may be utilized in maintaining cache coherency. In a snoop environment, each cache line may be marked as being in any one of a shared state, an exclusive state, a changed state, an invalid state and the like in order to facilitate sharing.

I/O units 454 (FIG. 17) may provide the processor with means for attaching to peripheral devices including tape, disc, printers, displays, and networks for example. I/O units are often presented to the computer program by software drivers. In mainframes, such as the System z® system from IBM®, channel adapters and open system adapters are I/O units of the mainframe that provide the communications between the operating system and peripheral devices.

Further, other types of computer systems may benefit from one or more aspects of the present invention. As an example, the computer system may comprise an emulator, e.g., software or other emulation mechanisms, in which a particular architecture including, for example, instruction execution, architected functions, such as address translation, and architected registers, is emulated or in which a subset thereof is emulated, e.g., on a native computer system having a processor and memory. In such an environment, one or more emulation functions of the emulator may implement one or more aspects of the present invention, even though a computer executing the emulator may have a different architecture than the capabilities being emulated. For example, in emulation mode, the specific instruction or operation being emulated may be decoded, and an appropriate emulation function may be built to implement the individual instruction or operation.

In an emulation environment, a host computer may for example comprise a memory to store instructions and data, an instruction fetch unit to fetch instructions from memory and to optionally provide local buffering for the fetched instruction, an instruction decode unit to receive the fetched instructions and to determine the type of instructions that have been fetched, and an instruction execution unit to execute the instructions. Execution may include loading data into a register from memory, storing data back to memory from a register, and/or performing some type of arithmetic or logical operation, as determined by the decode unit. For example, each unit may be implemented in software. Operations being performed by the units may be implemented as one or more subroutines within emulator software.

More particularly, in a mainframe, architected machine instructions are used by programmers, like e.g. "C" programmers, e.g., by way of a compiler application. These instructions stored in the storage medium may be executed natively in a z/Architecture® hardware architecture IBM® Server, or alternatively in machines executing other architectures. They may be emulated in the existing and in future IBM® mainframe servers and on other machines of IBM® (e.g., Power Systems servers and System x® Servers). They may be executed in machines running Linux on a wide variety of machines using hardware manufactured by IBM®, Intel®, AMD™, and others. Besides execution on that hardware under a z/Architecture® hardware architecture, Linux may be used as well as machines which use emulation by Hercules, UMX, or FSI (Fundamental Software, Inc), where generally execution is in an emulation mode. In emulation mode, emulation software is executed by a native processor to emulate the architecture of an emulated processor.

A native processor may execute emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion may be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, may be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware.

Figure 19:
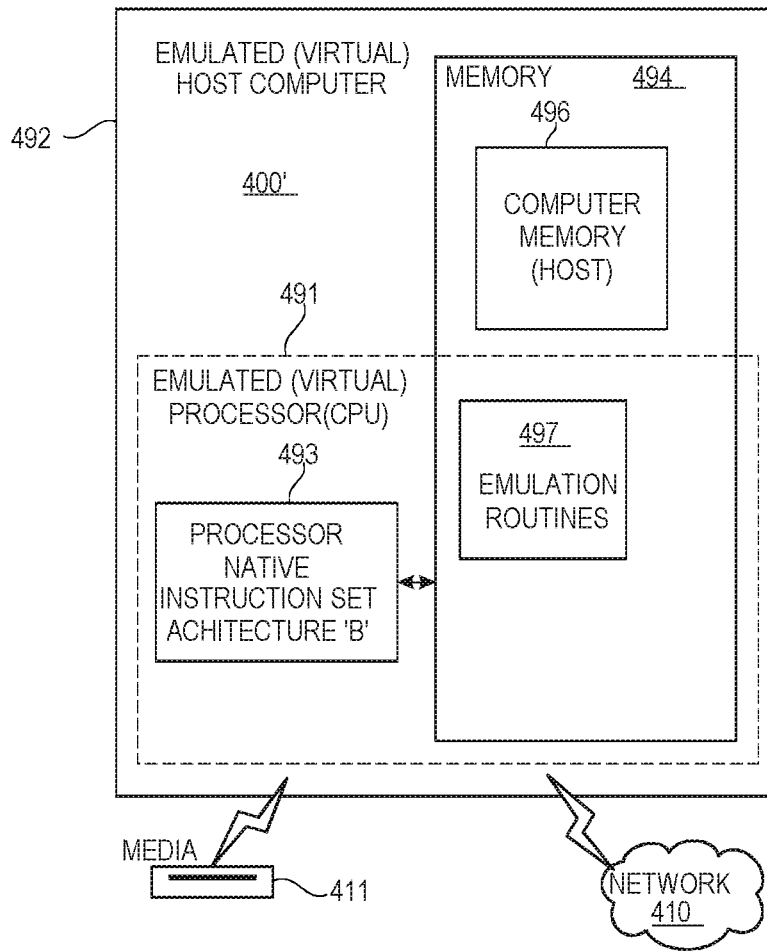
FIG. 19 depicts one example of a schematic diagram of an example computer system.

In FIG. 19, an example of an emulated host computer system 492 is provided that emulates a host computer system 400' of a host architecture. In the emulated host computer system 492, the host processor, i.e., CPU 491 is an emulated host processor or virtual host processor and comprises an emulation processor 493 having a different native instruction set architecture than that of the processor 491 of the host computer 400'. The emulated host computer system 492 has memory 494 accessible to the emulation processor 493. In the example embodiment, the memory 494 is partitioned into a host computer memory 496 portion and an emulation routines 497 portion. The host computer memory 496 is available to programs of the emulated host computer 492 according to host computer architecture. The emulation processor 493 executes native instructions of an architected instruction set of an architecture other than that of the emulated processor 491, the native instructions obtained from emulation routines memory 497, and may access a host instruction for execution from a program in host computer memory 496 by employing one or more instructions obtained in a sequence and access/decode routine which may decode the host instructions accessed to determine a native instruction execution routine for emulating the function of the host instruction accessed. Other facilities that are defined for the host computer system 400' architecture may be emulated by architected facilities routines, including such facilities as general purpose registers, control registers, dynamic address translation and I/O subsystem support and processor cache, for example. The emulation routines may also take advantage of functions available in the emulation processor 493, such as general registers and dynamic translation of virtual addresses, to improve performance of the emulation routines. Special hardware and off-load engines may also be provided to assist the processor 493 in emulating the function of the host computer 400'.

It is understood that one or more of the aforementioned embodiments of the invention may be combined as long as the combined embodiments are not mutually exclusive. Ordinal numbers, like e.g. 'first' and 'second', are used herein to indicate different elements assigned with the same name, but do not necessarily establish any order of the respective elements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combinations of features described herein may be the following:

In one aspect, a method for providing an interrupt signal to a first guest operating system executed using one or more processors of a plurality of processors of a computer system assigned for usage by the first guest operating system is provided. The computer system further comprises one or more bus connected modules being operationally connected with the plurality of processors via a bus and a bus attachment device. The computer system further comprises a memory operationally connected with the bus attachment device. Each processor of the plurality of processors is assigned with a logical processor ID used by the bus attachment device to address the respective processor, and each processor of the plurality of processors assigned for usage by the first guest operating system is further assigned with an interrupt target ID used by the first guest operating system and the one or more first bus connected modules to address the respective processor. The first guest operating system is implemented using a second guest operating system as a host hosting the first guest operating system. The method comprises: receiving by the bus attachment device an interrupt signal from one of the bus connected modules with an interrupt target ID, the interrupt target ID identifying one of the processors assigned for usage by the first guest operating system as a target processor for handling the interrupt signal; retrieving by the bus attachment device a first copy of an interrupt table entry assigned to the received interrupt target ID from an interrupt table stored in a first memory section of the memory assigned to the second guest operating system, the first copy of the interrupt table entry comprising a mapping of the received interrupt target ID to a logical processor ID; translating by the bus attachment device the received interrupt target ID to the logical processor ID using the first copy of the interrupt table entry; and forwarding by the bus attachment device the interrupt signal to the target processor for handling using the logical processor ID resulting from the translation to address the target processor directly.

In one embodiment, the memory comprises in a second memory section assigned to the first guest operating system a directed interrupt summary vector with a directed interrupt summary indicator per interrupt target ID. Each directed interrupt summary indicator is assigned to an interrupt target ID indicating whether there is a first interrupt signal addressed to the respective interrupt target ID to be handled. The memory comprises in the first memory section a forwarding vector comprising a first set of forwarding vector entries. The first set of forwarding vector entries comprises for each of the directed interrupt summary indicators of the directed interrupt summary vector a forwarding vector entry assigned to the respective directed interrupt summary indicator. Each forwarding vector entry indicates whether the respective directed interrupt summary indicator to which it is assigned is to be updated in order to indicate for the first operating system that there is a first interrupt signal addressed to the respective interrupt target ID to be handled. The method further comprises: checking by the bus attachment device whether the target processor is scheduled for usage by the first guest operating system; and if the target processor is scheduled for usage by the first guest operating system, the translating and direct forwarding are performed, else forwarding by the bus attachment device the first interrupt signal for handling to the first operating system using broadcasting, the broadcasting comprising selecting by the bus attachment device a forwarding vector entry of the first set of forwarding vector entries which is assigned to the received interrupt target ID and updating the selected forwarding vector entry such that it indicates that the directed interrupt summary indicator to which it is assigned is to be updated in order to indicate for the first operating system that there is a first interrupt signal addressed to the respective interrupt target ID to be handled.

In one embodiment, the first memory section further comprises a guest interrupt table. The guest interrupt table comprises a first set of guest interrupt table entries. The first set of guest interrupt table entries comprises a directed interrupt summary address indicator for each of the directed interrupt summary indicators of the directed interrupt summary vector with the respective directed interrupt summary address indicator indicating a memory address of the respective directed interrupt summary indicator in the second memory section. The assignments of the forwarding vector entries of the first set of forwarding vector entries is implemented using the guest interrupt table with each forwarding vector of the first set of forwarding vector entries being assigned a guest interrupt table entry of the first set of guest interrupt table entries. A directed interrupt summary address indicator of the respective guest interrupt table entry indicates the memory address of the directed interrupt summary to which the respective forwarding vector entry is assigned.

In one embodiment, each of the forwarding vector entries is implemented as a single bit.

In one embodiment, the directed interrupt summary vector is implemented as a contiguous area in memory.

In one embodiment, each of the directed interrupt summary indicators is implemented as a single bit.

In one embodiment, the retrieved copy of the interrupt table entry further comprises a forwarding vector entry address indicator indicating a memory address of the forwarding vector entry assigned to the received interrupt target ID in the first memory section. The method further comprises using by the bus attachment device the forwarding vector entry address indicator comprised by the retrieved copy of the interrupt table entry for the identifying of the forwarding vector entry assigned to the received interrupt target ID.

In one embodiment, the retrieved copy of the interrupt table entry further comprises a running indicator indicating whether the target processor identified by the interrupt target ID is scheduled for usage by the first guest operating system. The method further comprises using by the bus attachment device the running indicator comprised by the copy of the interrupt table entry for the checking whether the target processor is scheduled for usage by the first guest operating system.

In one embodiment, the retrieved copy of the interrupt table entry further comprises a first logical partition ID identifying a logical partition to which the first guest operating system is assigned and a first guest interrupt state area address indicator indicating a memory address of a guest interrupt state area assigned to the first guest operating system in the first memory section.

In one embodiment, the guest interrupt state area assigned to the first guest operating system comprises a pending interrupt indicator indicating whether a first interrupt signal for handling to the first operating system by the first operating system using broadcasting is pending. The method further comprises, if the first interrupt signal is forwarded using broadcasting updating by the bus attachment device the pending interrupt indicator such that the updated pending interrupt indicator indicates that a first interrupt signal for handling by the first operating system using broadcasting is pending.

In one embodiment, the method further comprises retrieving by the bus attachment device a copy of a device table entry from a device table. The device table entry comprises an interrupt table address indicator indicating a memory address of the interrupt table. The bus attachment device uses the memory address of the interrupt table for the retrieving of the first copy of the interrupt table entry.

In one embodiment, the device table is stored in a third memory section of the memory. The third memory section is protected against accesses by the first and second operating system.

In one embodiment, the retrieved copy of the device table entry further comprises a second logical partition ID identifying the logical partition to which the first guest operating system is assigned and a second guest interrupt state area address indicator indicating the memory address of the guest interrupt state area assigned to the first guest operating system in the first memory section. The method further comprises checking by the bus attachment device that the interrupt table entry stored in the first memory section accessible by the second guest operating system is unchanged by the second guest operating system using a comparison of a first combination of the first logical partition ID and the first guest interrupt state area address indicator provided by the interrupt table entry and a second combination of a second logical partition ID and a second guest interrupt state area address indicator provided by a device table entry stored in the protected third memory section, a match of the first and second combination indicating that the interrupt table entry is unchanged.

In one embodiment, the device table entry further comprises a logical partition ID identifying a logical partition to which the guest operating system is assigned, and the forwarding of the first interrupt signal by the bus attachment device further comprises forwarding with the first interrupt signal the logical partition ID.

In one embodiment, the device table entry further comprises an interrupt subclass ID identifying an interrupt subclass to which the first interrupt signal is assigned, and the forwarding of the first interrupt signal by the bus attachment device further comprises forwarding with the first interrupt signal the interrupt subclass ID.

In one embodiment, the second memory section further comprises a directed first interrupt signal vector per interrupt target ID assigned to the respective interrupt target ID. Each directed first interrupt signal vector comprises a first interrupt signal indicator per first bus connected module assigned to the first bus connected module. Each directed first interrupt signal vector indicates whether there is a first interrupt signal issued by the first bus connected module and addressed to the respective interrupt target ID to be handled. The method further comprises: selecting by the bus attachment device the directed first interrupt signal vector assigned to the interrupt target ID to which the first interrupt signal is addressed; selecting by the bus attachment device in the selected directed first interrupt signal vector the directed first interrupt signal indicator assigned to the first bus connected module which issued the first interrupt signal; and updating by the bus attachment device the selected directed first interrupt signal indicator such that the updated directed first interrupt signal indicator indicates that there is a first interrupt signal issued by the first bus connected module and addressed to the respective interrupt target ID to be handled.

In one embodiment, the first interrupt signal is received in a form of a message signaled interrupt comprising the interrupt target ID of the target processor.

In one embodiment, the second memory section further comprises an interrupt summary vector with an interrupt summary indicator per bus connected module. Each interrupt summary indicator is assigned to a bus connected module indicating whether there is an interrupt signal issued by the respective bus connected module to be handled. The forwarding vector comprises a second set of forwarding vector entries. The second set of forwarding vector entries comprises for each of the interrupt summary indicators of the interrupt summary vector a forwarding vector entry assigned to the respective interrupt summary indicator. Each forwarding vector entry indicates whether the respective interrupt summary indicator to which it is assigned is to be updated in order to indicate for the first operating system that there is a first interrupt signal issued by the respective bus connected module to be handled. The method further comprises: receiving by the bus attachment device a second interrupt signal from a second bus connected module with an interrupt target ID, the interrupt target ID identifying one of the processors assigned for usage by the first guest operating system as a second target processor for handling the second interrupt signal; checking by the bus attachment device whether the second target processor is scheduled for usage by the first guest operating system; and if the second target processor is scheduled for usage by the first guest operating system, translating by the bus attachment device the received interrupt target ID to a logical processor ID and forwarding the second interrupt signal to the second target processor for handling using the logical processor ID resulting from the translation to address the second target processor directly, else forwarding by the bus attachment device the second interrupt signal for handling to the first operating system using broadcasting, the broadcasting comprising selecting by the bus attachment device a forwarding vector entry of the second set of forwarding vector entries which is assigned to the received interrupt target ID and updating the selected forwarding vector entry such that it indicates that the interrupt summary indicator to which it is assigned is to be updated in order to indicate for the first operating system that there is a first interrupt signal issued by the second bus connected module to be handled.

In one embodiment, the guest interrupt table comprises a second set of guest interrupt table entries. The second set of guest interrupt table entries comprises an interrupt summary address indicator for each of the interrupt summary indicators of the interrupt summary vector with the respective interrupt summary address indicator indicating a memory address of the respective interrupt summary indicator in the second memory section. The assignments of the forwarding vector entries of the second set of forwarding vector entries are implemented using the guest interrupt table with each forwarding vector of the second set of forwarding vector entries being assigned a guest interrupt table entry of the second set of guest interrupt table entries. A directed interrupt summary address indicator of the respective guest interrupt table entry indicating the memory address of the interrupt summary indicator to which the respective forwarding vector entry is assigned.

In one embodiment, the second memory section further comprises an interrupt signal vector per bus connected module assigned to the respective bus connected module. Each interrupt signal vector comprises an interrupt signal indicator per interrupt target ID assigned to the respective bus connected module, and each interrupt signal vector indicates whether there is an interrupt signal issued by the respective bus connected module and addressed to the respective interrupt target ID to be handled. The method further comprises: selecting by the bus attachment device the directed interrupt signal vector assigned to the second bus connected module; selecting by the bus attachment device in the selected interrupt signal vector the interrupt signal indicator assigned to the interrupt target ID to which the second interrupt signal is addressed; and updating by the bus attachment device the selected interrupt signal indicator such that the updated interrupt signal indicator indicates that there is an interrupt signal issued by the second bus connected module and addressed to the respective interrupt target ID to be handled.

In one embodiment, the first guest operating system is a guest operating system of a second level of virtualization and the second guest operating system is a guest operating system of a first level of virtualization.

In one embodiment, the first guest operating system is a guest operating system of a third level of virtualization and the second guest operating system is a guest operating system of a second level of virtualization.

In one aspect, a computer system for providing an interrupt signal to a first guest operating system executed using one or more processors of a plurality of processors of the computer system assigned for usage by the first guest operating system is provided. The computer system further comprises one or more bus connected modules being operationally connected with the plurality of processors via a bus and a bus attachment device. The computer system further comprises a memory operationally connected with the bus attachment device. Each processor of the plurality of processors is assigned with a logical processor ID used by the bus attachment device to address the respective processor, and each processor of the plurality of processors assigned for usage by the first guest operating system is further assigned with an interrupt target ID used by the first guest operating system and the one or more first bus connected modules to address the respective processor. The first guest operating system is implemented using a second guest operating system as a host hosting the first guest operating system. The computer system is configured to perform a method comprises: receiving by the bus attachment device an interrupt signal from one of the bus connected modules with an interrupt target ID, the interrupt target ID identifying one of the processors assigned for usage by the first guest operating system as a target processor for handling the interrupt signal; retrieving by the bus attachment device a first copy of an interrupt table entry assigned to the received interrupt target ID from an interrupt table stored in a first memory section of the memory assigned to the second guest operating system, the first copy of the interrupt table entry comprising a mapping of the received interrupt target ID to a logical processor ID; translating by the bus attachment device the received interrupt target ID to the logical processor ID using the first copy of the interrupt table entry; and forwarding by the bus attachment device the interrupt signal to the target processor for handling using the logical processor ID resulting from the translation to address the target processor directly.

In one aspect, a computer program product for providing an interrupt signal to a first guest operating system executed using one or more processors of a plurality of processors of a computer system assigned for usage by the first guest operating system is provided. The computer system further comprises one or more bus connected modules being operationally connected with the plurality of processors via a bus and a bus attachment device. The computer system further comprises a memory operationally connected with the bus attachment device. Each processor of the plurality of processors is assigned with a logical processor ID used by the bus attachment device to address the respective processor, and each processor of the plurality of processors assigned for usage by the first guest operating system is further assigned with an interrupt target ID used by the first guest operating system and the one or more first bus connected modules to address the respective processor. The first guest operating system is implemented using a second guest operating system as a host hosting the first guest operating system. The computer program product comprises a computer readable non-transitory medium readable by a processing circuit and storing instructions for execution by the processing circuit for performing a method comprising: receiving by the bus attachment device an interrupt signal from one of the bus connected modules with an interrupt target ID, the interrupt target ID identifying one of the processors assigned for usage by the first guest operating system as a target processor for handling the interrupt signal; retrieving by the bus attachment device a first copy of an interrupt table entry assigned to the received interrupt target ID from an interrupt table stored in a first memory section of the memory assigned to the second guest operating system, the first copy of the interrupt table entry comprising a mapping of the received interrupt target ID to a logical processor ID; translating by the bus attachment device the received interrupt target ID to the logical processor ID using the first copy of the interrupt table entry; and forwarding by the bus attachment device the interrupt signal to the target processor for handling using the logical processor ID resulting from the translation to address the target processor directly.

What is claimed is:

1. A computer program product for providing an interrupt signal to a first guest operating system executed using one or more processors of a plurality of processors of a computer system assigned for usage by the first guest operating system, the computer program product comprising:
   at least one computer readable storage medium readable by at least one processing circuit and storing instructions for performing a method comprising:
      receiving, by a bus attachment device from one bus connected module of a plurality of bus connected modules operationally coupled to the plurality of processors via the bus attachment device, an interrupt signal with an interrupt target ID, the interrupt target ID identifying one processor of the plurality of processors assigned for usage by the first guest operating system as a target processor to handle the interrupt signal, the first guest operating system implemented using a second guest operating system as a host hosting the first guest operating system;
      retrieving, by the bus attachment device, a copy of an interrupt table entry assigned to the interrupt target ID from an interrupt table stored in a first memory section of a memory operationally connected with the bus attachment device, the first memory section being assigned to the second guest operating system, and the copy of the interrupt table entry comprising a mapping of the interrupt target ID to a logical processor ID;

translating, by the bus attachment device, the interrupt target ID to the logical processor ID using the copy of the interrupt table entry; and forwarding, by the bus attachment device, the interrupt signal to the target processor to handle, the forwarding using the logical processor ID resulting from the translating to address the target processor directly.

2. The computer program product of claim 1, wherein the memory further comprises in a second memory section assigned to the first guest operating system a directed interrupt summary vector with a directed interrupt summary indicator per interrupt target ID, each directed interrupt summary indicator being assigned to a respective interrupt target ID to indicate whether there is a respective interrupt signal addressed to the respective interrupt target ID to be handled, and wherein the memory comprises in the first memory section a forwarding vector comprising a first set of forwarding vector entries, the first set of forwarding vector entries comprising for each directed interrupt summary indicator of the directed interrupt summary vector a forwarding vector entry assigned to a respective directed interrupt summary indicator, each forwarding vector entry indicating whether the respective directed interrupt summary indicator to which it is assigned is to be updated in order to indicate for the first guest operating system that there is the respective interrupt signal addressed to the respective interrupt target ID to be handled, and wherein the method further comprises:

checking, by the bus attachment device, whether the target processor is scheduled for usage by the first guest operating system; and performing the translating and the forwarding, based on the target processor being scheduled for usage by the first guest operating system, else forwarding, by the bus attachment device, the interrupt signal to the first guest operating system using broadcasting, the broadcasting comprising selecting by the bus attachment device a selected forwarding vector entry of the first set of forwarding vector entries which is assigned to the interrupt target ID and updating the selected forwarding vector entry such that it indicates that the respective directed interrupt summary indicator to which it is assigned is to be updated in order to indicate for the first guest operating system that there is the interrupt signal addressed to the interrupt target ID to be handled.

3. The computer program product of claim 2, wherein the second memory section of the memory further comprises an interrupt summary vector with an interrupt summary indicator per bus connected module to indicate whether there is the respective interrupt signal issued by the respective bus connected module to be handled, and wherein the forwarding vector further comprises a second set of forwarding vector entries, the second set of forwarding vector entries comprising a second forwarding vector entry assigned to a respective interrupt summary indicator, the second forwarding vector entry to indicate whether the respective interrupt summary indicator to which it is assigned is to be updated in order to indicate for the first guest operating system that there is the respective interrupt signal issued by the respective bus connected module to be handled, and wherein the method further comprises:

receiving, by the bus attachment device, another interrupt signal from a second bus connected module with another interrupt target ID, the other interrupt target ID identifying a second target processor for usage by the first guest operating system to handle the other interrupt signal;

checking, by the bus attachment device, whether the second target processor is scheduled for usage by the first guest operating system;

translating, by the bus attachment device based on the second target processor being scheduled for usage by the first guest operating system, the other interrupt target ID to another logical processor ID and forwarding the other interrupt signal to the second target processor to handle using the other logical processor ID resulting from the translating to address the second target processor directly; and forwarding by the bus attachment device based on the second target processor not being scheduled, the second interrupt signal to the first guest operating system using broadcasting, the broadcasting comprising selecting, by the bus attachment device, a selected second forwarding vector entry of the second set of forwarding vector entries which is assigned to the other interrupt target ID and updating the selected second forwarding vector entry such that it indicates that the respective interrupt summary indicator to which it is assigned is to be updated in order to indicate for the first guest operating system that there is the second interrupt signal issued by the second bus connected module to be handled.

4. The computer program product of claim 2, wherein the first memory section further comprises a guest interrupt table, the guest interrupt table comprising a first set of guest interrupt table entries, the first set of guest interrupt table entries comprising a directed interrupt summary address indicator for each of the directed interrupt summary indicators of the directed interrupt summary vector with a respective directed interrupt summary address indicator indicating a memory address of the respective directed interrupt summary indicator in the second memory section, and wherein assignments of forwarding vector entries of the first set of forwarding vector entries are implemented using the guest interrupt table with each forwarding vector entry of the first set of forwarding vector entries being assigned a guest interrupt table entry of the first set of guest interrupt table entries, and wherein the directed interrupt summary address indicator of the respective guest interrupt table entry indicates the memory address of the respective directed interrupt summary indicator to which a respective forwarding vector entry is assigned.

5. The computer program product of claim 2, wherein the copy of the interrupt table entry further comprises a running indicator to indicate whether the target processor identified by the interrupt target ID is scheduled for usage by the first guest operating system, and wherein the method further comprises using, by the bus attachment device, the running indicator comprised by the copy of the interrupt table entry for the checking whether the target processor is scheduled for usage by the first guest operating system.

6. The computer program product of claim 1, wherein the copy of the interrupt table entry further comprises a forwarding vector entry address indicator to indicate a memory address of a forwarding vector entry assigned to the interrupt target ID in the first memory section, and wherein the method further comprises using, by the bus attachment device, the forwarding vector entry address indicator comprised by the copy of the interrupt table entry to identify the forwarding vector entry assigned to the interrupt target ID, the forwarding vector entry to be used to indicate the interrupt signal is to be handled.

7. The computer program product of claim 1, wherein the copy of the interrupt table entry further comprises a first logical partition ID identifying a logical partition to which the first guest operating system is assigned and a first guest interrupt state area address indicator indicating a memory address of a guest interrupt state area assigned to the first guest operating system in the first memory section.

8. The computer program product of claim 7, wherein the guest interrupt state area assigned to the first guest operating system comprises a pending interrupt indicator indicating whether one or more interrupt signals for handling by the first guest operating system using broadcasting is pending, and wherein the method further comprises updating, by the bus attachment device based on the interrupt signal being forwarded using broadcasting, the pending interrupt indicator such that the pending interrupt indicator indicates that the interrupt signal for handling by the first guest operating system using broadcasting is pending.

9. The computer program product of claim 7, wherein the method further comprises retrieving, by the bus attachment device, a copy of a device table entry from a device table, the device table entry comprising an interrupt table address indicator indicating a memory address of the interrupt table, the bus attachment device using the memory address of the interrupt table for the retrieving of the copy of the interrupt table entry.

10. The computer program product of claim 9, wherein the copy of the device table entry further comprises a second logical partition ID identifying the logical partition to which the first guest operating system is assigned and a second guest interrupt state area address indicator indicating the memory address of the guest interrupt state area assigned to the first guest operating system in the first memory section, and wherein the method further comprises checking, by the bus attachment device, that the copy of the interrupt table entry stored in the first memory section accessible by the second guest operating system is unchanged by the second guest operating system, the checking using a comparison of a first combination of the first logical partition ID and the first guest interrupt state area address indicator provided by the copy of the interrupt table entry and a second combination of the second logical partition ID and the second guest interrupt state area address indicator provided by the copy of the device table entry, a match of the first and second combinations indicating that the copy of the interrupt table entry is unchanged.

11. The computer program product of claim 1, wherein the first guest operating system is a guest operating system of a second level of virtualization and the second guest operating system is a guest operating system of a first level of virtualization.

12. The computer program product of claim 1, wherein the first guest operating system is a guest operating system of one level of virtualization and the second guest operating system is a guest operating system of another level of virtualization.

13. A computer system for providing an interrupt signal to a first guest operating system executed using one or more processors of a plurality of processors of a computer system assigned for usage by the first guest operating system, the computer system comprising:
    a memory; and
    a processor in communication with the memory, wherein the computer system is configured to perform a method, said method comprising:
        receiving, by a bus attachment device from one bus connected module of a plurality of bus connected modules operationally coupled to the plurality of processors via the bus attachment device, an interrupt signal with an interrupt target ID, the interrupt target ID identifying one processor of the plurality of processors assigned for usage by the first guest operating system as a target processor to handle the interrupt signal, the first guest operating system implemented using a second guest operating system as a host hosting the first guest operating system;
        retrieving, by the bus attachment device, a copy of an interrupt table entry assigned to the interrupt target ID from an interrupt table stored in a first memory section of a memory operationally connected with the bus attachment device, the first memory section being assigned to the second guest operating system, and the copy of the interrupt table entry comprising a mapping of the interrupt target ID to a logical processor ID;
        translating, by the bus attachment device, the interrupt target ID to the logical processor ID using the copy of the interrupt table entry; and
        forwarding, by the bus attachment device, the interrupt signal to the target processor to handle, the forwarding using the logical processor ID resulting from the translating to address the target processor directly.

14. The computer system of claim 13, wherein the memory further comprises in a second memory section assigned to the first guest operating system a directed interrupt summary vector with a directed interrupt summary indicator per interrupt target ID, each directed interrupt summary indicator being assigned to a respective interrupt target ID to indicate whether there is a respective interrupt signal addressed to the respective interrupt target ID to be handled, and wherein the memory comprises in the first memory section a forwarding vector comprising a first set of forwarding vector entries, the first set of forwarding vector entries comprising for each directed interrupt summary indicator of the directed interrupt summary vector a forwarding vector entry assigned to a respective directed interrupt summary indicator, each forwarding vector entry indicating whether the respective directed interrupt summary indicator to which it is assigned is to be updated in order to indicate for the first guest operating system that there is the respective interrupt signal addressed to the respective interrupt target ID to be handled, and wherein the method further comprises:
    checking, by the bus attachment device, whether the target processor is scheduled for usage by the first guest operating system; and
    performing the translating and the forwarding, based on the target processor being scheduled for usage by the first guest operating system, else forwarding, by the bus attachment device, the interrupt signal to the first guest operating system using broadcasting, the broadcasting comprising selecting by the bus attachment device a selected forwarding vector entry of the first set of forwarding vector entries which is assigned to the interrupt target ID and updating the selected forwarding vector entry such that it indicates that the respective directed interrupt summary indicator to which it is assigned is to be updated in order to indicate for the first guest operating system that there is the interrupt signal addressed to the interrupt target ID to be handled.

15. The computer system of claim 14, wherein the second memory section of the memory further comprises an interrupt summary vector with an interrupt summary indicator per bus connected module to indicate whether there is the respective interrupt signal issued by the respective bus connected module to be handled, and wherein the forwarding vector further comprises a second set of forwarding vector entries, the second set of forwarding vector entries comprising a second forwarding vector entry assigned to a respective interrupt summary indicator, the second forwarding vector entry to indicate whether the respective interrupt summary indicator to which it is assigned is to be updated in order to indicate for the first guest operating system that there is the respective interrupt signal issued by the respective bus connected module to be handled, and wherein the method further comprises:

receiving, by the bus attachment device, another interrupt signal from a second bus connected module with another interrupt target ID, the other interrupt target ID identifying a second target processor for usage by the first guest operating system to handle the other interrupt signal;

checking, by the bus attachment device, whether the second target processor is scheduled for usage by the first guest operating system;

translating, by the bus attachment device based on the second target processor being scheduled for usage by the first guest operating system, the other interrupt target ID to another logical processor ID and forwarding the other interrupt signal to the second target processor to handle using the other logical processor ID resulting from the translating to address the second target processor directly; and forwarding by the bus attachment device based on the second target processor not being scheduled, the second interrupt signal to the first guest operating system using broadcasting, the broadcasting comprising selecting, by the bus attachment device, a selected second forwarding vector entry of the second set of forwarding vector entries which is assigned to the other interrupt target ID and updating the selected second forwarding vector entry such that it indicates that the respective interrupt summary indicator to which it is assigned is to be updated in order to indicate for the first guest operating system that there is the second interrupt signal issued by the second bus connected module to be handled.

16. The computer system of claim 13, wherein the copy of the interrupt table entry further comprises a forwarding vector entry address indicator to indicate a memory address of a forwarding vector entry assigned to the interrupt target ID in the first memory section, and wherein the method further comprises using, by the bus attachment device, the forwarding vector entry address indicator comprised by the copy of the interrupt table entry to identify the forwarding vector entry assigned to the interrupt target ID, the forwarding vector entry to be used to indicate the interrupt signal is to be handled.

17. A computer-implemented method of providing an interrupt signal to a first guest operating system executed using one or more processors of a plurality of processors of a computer system assigned for usage by the first guest operating system, the computer-implemented method comprising:

receiving, by a bus attachment device from one bus connected module of a plurality of bus connected modules operationally coupled to the plurality of processors via the bus attachment device, an interrupt signal with an interrupt target ID, the interrupt target ID identifying one processor of the plurality of processors assigned for usage by the first guest operating system as a target processor to handle the interrupt signal, the first guest operating system implemented using a second guest operating system as a host hosting the first guest operating system;

retrieving, by the bus attachment device, a copy of an interrupt table entry assigned to the interrupt target ID from an interrupt table stored in a first memory section of a memory operationally connected with the bus attachment device, the first memory section being assigned to the second guest operating system, and the copy of the interrupt table entry comprising a mapping of the interrupt target ID to a logical processor ID;

translating, by the bus attachment device, the interrupt target ID to the logical processor ID using the copy of the interrupt table entry; and forwarding, by the bus attachment device, the interrupt signal to the target processor to handle, the forwarding using the logical processor ID resulting from the translating to address the target processor directly.

18. The computer-implemented method of claim 17, further comprises in a second memory section assigned to the first guest operating system a directed interrupt summary vector with a directed interrupt summary indicator per interrupt target ID, each directed interrupt summary indicator being assigned to a respective interrupt target ID to indicate whether there is a respective interrupt signal addressed to the respective interrupt target ID to be handled, and wherein the memory comprises in the first memory section a forwarding vector comprising a first set of forwarding vector entries, the first set of forwarding vector entries comprising for each directed interrupt summary indicator of the directed interrupt summary vector a forwarding vector entry assigned to a respective directed interrupt summary indicator, each forwarding vector entry indicating whether the respective directed interrupt summary indicator to which it is assigned is to be updated in order to indicate for the first guest operating system that there is the respective interrupt signal addressed to the respective interrupt target ID to be handled, and further comprises:

checking, by the bus attachment device, whether the target processor is scheduled for usage by the first guest operating system; and performing the translating and the forwarding, based on the target processor being scheduled for usage by the first guest operating system, else forwarding, by the bus attachment device, the interrupt signal to the first guest operating system using broadcasting, the broadcasting comprising selecting by the bus attachment device a selected forwarding vector entry of the first set of forwarding vector entries which is assigned to the interrupt target ID and updating the selected forwarding vector entry such that it indicates that the respective directed interrupt summary indicator to which it is assigned is to be updated in order to indicate for the first guest operating system that there is the interrupt signal addressed to the interrupt target ID to be handled.

19. The computer-implemented method of claim 18, wherein the second memory section of the memory further comprises an interrupt summary vector with an interrupt summary indicator per bus connected module to indicate whether there is the respective interrupt signal issued by the respective bus connected module to be handled, and wherein the forwarding vector further comprises a second set of forwarding vector entries, the second set of forwarding vector entries comprising a second forwarding vector entry assigned to a respective interrupt summary indicator, the second forwarding vector entry to indicate whether the respective interrupt summary indicator to which it is assigned is to be updated in order to indicate for the first guest operating system that there is the respective interrupt signal issued by the respective bus connected module to be handled, and further comprises:

receiving, by the bus attachment device, another interrupt signal from a second bus connected module with another interrupt target ID, the other interrupt target ID identifying a second target processor for usage by the first guest operating system to handle the other interrupt signal;

checking, by the bus attachment device, whether the second target processor is scheduled for usage by the first guest operating system;

translating, by the bus attachment device based on the second target processor being scheduled for usage by the first guest operating system, the other interrupt target ID to another logical processor ID and forwarding the other interrupt signal to the second target processor to handle using the other logical processor ID resulting from the translating to address the second target processor directly; and forwarding by the bus attachment device based on the second target processor not being scheduled, the second interrupt signal to the first guest operating system using broadcasting, the broadcasting comprising selecting, by the bus attachment device, a selected second forwarding vector entry of the second set of forwarding vector entries which is assigned to the other interrupt target ID and updating the selected second forwarding vector entry such that it indicates that the respective interrupt summary indicator to which it is assigned is to be updated in order to indicate for the first guest operating system that there is the second interrupt signal issued by the second bus connected module to be handled.

20. The computer-implemented method of claim 17, wherein the copy of the interrupt table entry further comprises a forwarding vector entry address indicator to indicate a memory address of a forwarding vector entry assigned to the interrupt target ID in the first memory section, and further comprises using, by the bus attachment device, the forwarding vector entry address indicator comprised by the copy of the interrupt table entry to identify the forwarding vector entry assigned to the interrupt target ID, the forwarding vector entry to be used to indicate the interrupt signal is to be handled.

\* \* \* \* \*